(12) United States Patent
Kim et al.

(10) Patent No.: US 12,423,222 B2
(45) Date of Patent: Sep. 23, 2025

(54) MEMORY DEVICES

(71) Applicant: SK hynix Inc., Icheon-si (KR)

(72) Inventors: Dong-gun Kim, Icheon-si (KR);
Yongkee Kwon, Icheon-si (KR);
Dayeon Yun, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/411,473

(22) Filed: Jan. 12, 2024

(65) Prior Publication Data
US 2025/0021473 A1 Jan. 16, 2025

(30) Foreign Application Priority Data
Jul. 14, 2023 (KR) .................... 10-2023-0092070

(51) Int. Cl.
*G06F 12/02* (2006.01)
(52) U.S. Cl.
CPC .................. *G06F 12/0223* (2013.01)
(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595;
(Continued)

(56) References Cited

U.S. PATENT DOCUMENTS 5,019,968 A * 5/1991 Wang .................. G06F 15/8084
712/E9.046
9,766,818 B2 * 9/2017 Choi ..................... G06F 3/0644
(Continued)

FOREIGN PATENT DOCUMENTS

KR 1020200013461 A 2/2020
KR 1020200108772 A 9/2020

OTHER PUBLICATIONS

What Are PC Drivers and Why Do You Need Them ?; Emma Collins; Nov. 2, 2021; retrieved from https://www.online-tech-tips.com/what-are-pc-drivers-and-why-do-you-need-them/ (Year: 2021).*
(Continued)

*Primary Examiner* — Daniel C. Chappell
(74) *Attorney, Agent, or Firm* — WILLIAM PARK AND ASSOCIATES LTD.

(57) ABSTRACT

A memory device includes a memory-operator unit including memory circuits and operating circuits, and a request processing circuit configured to process a memory request and an operation request transmitted from a software domain to transmit a memory command and an address corresponding to the memory request and an operation command and an address corresponding to the operation request to the memory-operator unit. The request processing circuit is configured to schedule processing of the memory request and the operation request, based on a status of the memory request remaining in the request processing circuit, when the operation request is transmitted to the request processing circuit from the software domain.

19 Claims, 18 Drawing Sheets

(58) Field of Classification Search
CPC ...... G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153; G06N 3/00–126;
G06N 5/00–048; G06N 7/00–08; G06N
10/00; G06N 20/00–20; G06N
99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56) References Cited

U.S. PATENT DOCUMENTS

| | | | | |
|---|---|---|---|---|
| 11,513,733 | B2* | 11/2022 | Song | G06F 7/50 |
| 11,537,323 | B2* | 12/2022 | Song | G11C 11/54 |
| 11,734,006 | B2* | 8/2023 | Qadeer | G06F 9/30134 |
| | | | | 345/559 |
| 11,775,655 | B2* | 10/2023 | Malvankar | G06N 3/045 |
| | | | | 726/25 |
| 11,908,541 | B2* | 2/2024 | Song | G11C 7/1006 |
| 12,136,470 | B2* | 11/2024 | Song | G06F 7/5443 |
| 2010/0312990 | A1* | 12/2010 | Walker | G06F 13/1663 |
| | | | | 712/E9.002 |
| 2011/0093662 | A1* | 4/2011 | Walker | G06F 3/0683 |
| | | | | 711/147 |
| 2016/0188207 | A1* | 6/2016 | Choi | G06F 3/0685 |
| | | | | 711/153 |
| 2018/0107406 | A1* | 4/2018 | O | G06F 3/0611 |
| 2021/0208814 | A1* | 7/2021 | Song | G06F 7/5443 |
| 2022/0066923 | A1* | 3/2022 | Walter | G06F 12/0653 |
| 2022/0253247 | A1* | 8/2022 | Kim | G06F 3/0604 |
| 2023/0130969 | A1* | 4/2023 | Dutu | G11C 11/54 |
| | | | | 365/189.05 |
| 2024/0127107 | A1* | 4/2024 | Zhu | G06N 20/00 |
| 2024/0220443 | A1* | 7/2024 | Ko | G11C 7/1006 |

OTHER PUBLICATIONS

S. Lyles et al., "Machine Learning Analysis of Memory Images for Process Characterization and Malware Detection," 2022 52nd Annual IEEE/IFIP International Conference on Dependable Systems and Networks Workshops (DSN-W), Baltimore, MD, USA, 2022, pp. 162-169, doi: 10.1109/DSN-W54100.2022.00035. (Year: 2022).*

* cited by examiner

FIG.7

| MEMORY REQUEST INPUT | MEMORY REQUEST OUTPUT | MEMORY REQUEST QUEUE FULL | MEMORY REQUEST EMPTY |
|---|---|---|---|
| 1 (NO INPUT) | 1 (NO OUTPUT) | 1 (FULL STATUS) | 1 (EMPTY STATUS) |
| 0 (INPUT) | 0 (OUTPUT) | 0 (NOT FULL STATUS) | 0 (NOT EMPTY STATUS) |

MEMORY QUEUE STATUS SIGNAL (MQ_STAT)

MEMORY DEVICES

CROSS-REFERENCE TO RELATED APPLICATIONS

The present application claims priority under 35 U.S.C. 119(a) to Korean Patent Application No. 10-2023-0092070, filed on Jul. 14, 2023, in the Korean Intellectual Property Office, which is incorporated herein by reference in its entirety.

BACKGROUND

1. Technical Field

Various embodiments of the present disclosure generally relate to memory devices and, more particularly, to memory devices recognized as two independent devices of a memory and an operator.

2. Related Art

Recently, interest in artificial intelligence has been rapidly increased not only in the information technology (IT) industry, but also in the overall industries such as finance and medical care. Accordingly, introduction of artificial intelligence, more precisely, deep learning, is being considered and prototyped in various fields. In general, the deep learning collectively refers to technologies that effectively learn deep neural networks (DNNs) or deep networks with an increased number of layers than existing neural networks and utilize the deep neural networks (DNNs) or deep networks for pattern recognition or inference.

One of the backgrounds and causes of such a wide interest in the deep learning may be the performance improvement of processors that perform operations. To improve the performance of the artificial intelligence, as many as hundreds of layers of neural network are accumulated and learned. Such a trend has continued in recent years, and as a result, the amount of operation required for hardware that actually performs operation has increased exponentially. Moreover, in the case of an existing hardware system in which a memory and a processor are separated, the performance improvement of artificial intelligence hardware is hindered due to limitations in the amount of data communication between the memory and the processor. Recently, to solve this problem, a device in which a processor and a memory are integrated in a semiconductor chip itself has been used as a neural network computing device.

SUMMARY

A memory device according to an embodiment of the present disclosure may include a memory-operator unit including memory circuits and operating circuits, and a request processing circuit configured to process a memory request and an operation request transmitted from a software domain to transmit a memory command and an address corresponding to the memory request and an operation command and an address corresponding to the operation request to the memory-operator unit. The request processing circuit may be configured to schedule processing of the memory request and the operation request, based on a status of the memory request remaining in the request processing circuit, when the operation request is transmitted to the request processing circuit from the software domain.

BRIEF DESCRIPTION OF THE DRAWINGS

FIG. 7 illustrates an example of a memory queue status signal output from a memory request queue of the request processing circuit included in the memory device of FIG. 1.

DETAILED DESCRIPTION

Figure 1:
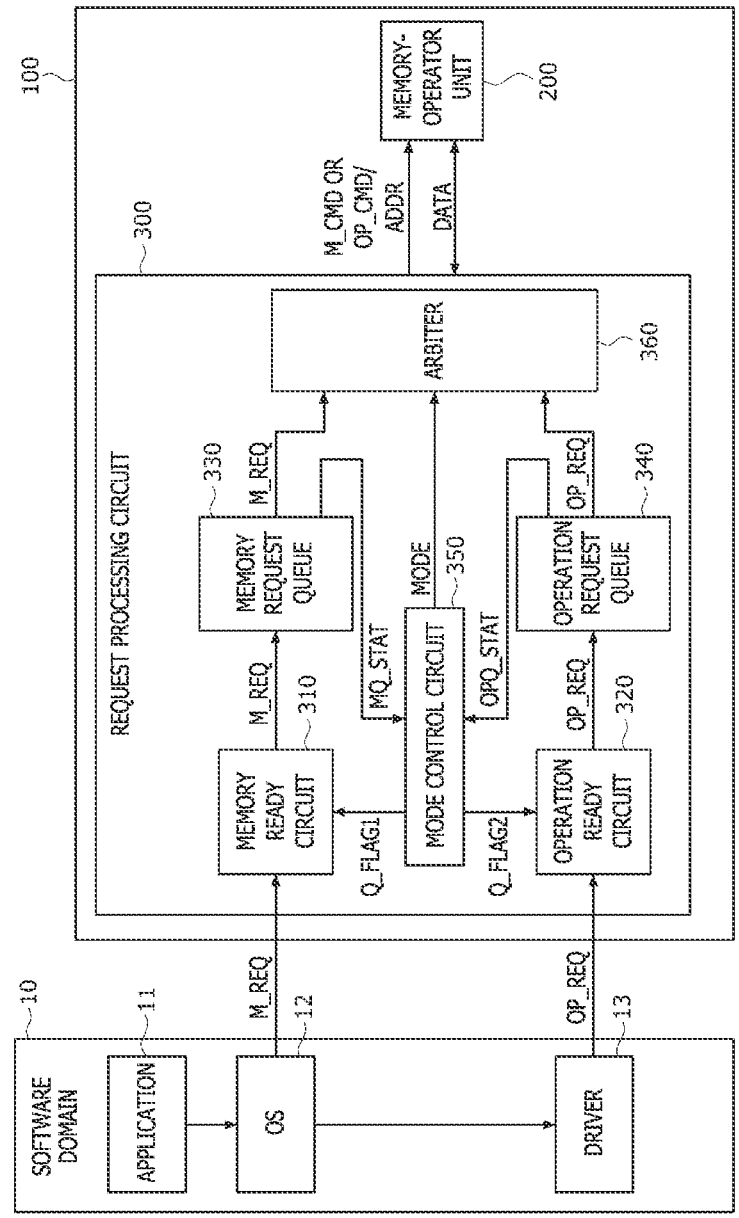
FIG. 1 is a block diagram illustrating a memory device according to an embodiment of the present disclosure, together with a software domain.

In the following description of embodiments, it will be understood that the terms "first" and "second" are intended to identify elements, but not used to define a particular number or sequence of elements. In addition, when an element is referred to as being located "on," "over," "above," "under," or "beneath" another element, it is intended to mean relative positional relationship, but not used to limit certain cases for which the element directly contacts the other element, or at least one intervening element is present between the two elements. Accordingly, the terms such as "on," "over," "above," "under," "beneath," "below," and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may be electrically or mechanically connected or coupled to the other element indirectly with one or more additional elements between the two elements.

Moreover, when a parameter is referred to as being "predetermined," it may be intended to mean that a value of the parameter is determined in advance of when the parameter is used in a process or an algorithm. The value of the parameter may be set when the process or the algorithm starts or may be set during a period in which the process or the algorithm is executed.

A logic "high" level and a logic "low" level may be used to describe logic levels of electric signals. A signal having a logic "high" level may be distinguished from a signal having a logic "low" level. For example, when a signal having a first voltage corresponds to a signal having a logic "high" level, a signal having a second voltage may correspond to a signal having a logic "low" level. In an embodiment, the logic "high" level may be set as a voltage level which is higher than a voltage level of the logic "low" level. Meanwhile, logic levels of signals may be set to be different or opposite according to embodiment. For example, a certain signal having a logic "high" level in one embodiment may be set to have a logic "low" level in another embodiment.

Various embodiments of the present disclosure will be described hereinafter in more detail with reference to the accompanying drawings. However, the embodiments described herein are for illustrative purposes only and are not intended to limit the scope of the present disclosure.

In various embodiments described below, a dynamic random access memory (DRAM) device is taken as an example as a memory device, but it is obvious that the present disclosure is not limited thereto. For example, the present disclosure is equally applicable to a static random access memory (SRAM) device, a synchronous DRAM (SDRAM) device, a double data rate synchronous DRAM (DDR SDRAM, DDR2 SDRAM, DDR3 SDRAM, etc.) device, a graphics double data rate synchronous DRAM (GDDR, GDDR2, GDDR3, etc.) device, a quad data rate DRAM (QDR DRAM) device, a RAMBUS XDR DRAM (XDR DRAM) device, a fast page mode DRAM (FPM DRAM) device, a video DRAM (VDRAM) device, an extended data output type DRAM (EDO DRAM) device, a burst EDO DRAM (BEDO DRAM) device, a multi-bank DRAM (MDRAM) device, a synchronous graphic RAM (SGRAM) device, and/or other types of DRAM devices.

FIG. 1 is a block diagram illustrating a memory device 100 according to an embodiment of the present disclosure, together with a software domain 10.

Referring to FIG. 1, the memory device 100 may include a memory-operator unit 200 and a request processing circuit 300. The memory-operator unit 200 may include memory circuits and operating circuits. The request processing circuit 300 may process a memory request M_REQ and an operation request OP_REQ transmitted from the software domain 10. The request processing circuit 300 may transmit a memory command M_CMD and an address ADDR corresponding to the memory request M_REQ to the memory-operator unit 200. In addition, the request processing circuit 300 may transmit an operation command OP_CMD and/or an address ADDR corresponding to the operation request OP_REQ to the memory-operator unit 200. The request processing circuit 300 may transmit data DATA to the memory-operator unit 200, or receive the data DATA from the memory-operator unit 200. Although not shown in FIG. 1, the request processing circuit 300 may include a request decoder that decodes the memory request M_REQ and the operation request OP_REQ to generate the memory command M_CMD and the operation command OP_CMD, respectively.

The software domain 10 may include an application 11, an operating system (OS) 12, and a driver 13. Although not shown in FIG. 1, the software domain 10 may include a framework, a runtime library, and the like. The application 11 may include various types of application programs driven by a host device, for example, a central processing unit (CPU). The operating system 12 may manage resources of the entire system including the host device and the memory device 100. The driver 13 may mean a hardware device driver constituting the entire system, and include software for controlling the memory device 100.

In the software domain 10, the memory device 100 may be recognized as an independent device as a memory or an operator. Accordingly, the memory request M_REQ for recognizing the memory device 100 as a memory and requesting a memory operation of the memory device 100 may be transmitted to the memory device 100 from the operating system 12 of the software domain 10. On the other hand, the operation request OP_REQ for recognizing the memory device 100 as an operator and requesting an operator operation of the memory device 100 may be transmitted from the driver 13 of the software domain 10 to the memory device 100. In an embodiment, the memory operation of the memory device 100 may include a data read operation and a data write operation for the memory circuits constituting the memory device 100. The operating system 12 of the software domain 10 may access the memory device 100 as a memory device through commands of "load" and "store". The operator operation of the memory device 100 may include an operation of transmitting operation data from the memory circuits to the operating circuits, an operation of performing operations in the operating circuits using the operation data, and an operation in which operation result data generated through the operations in the operating circuits are output from the operating circuits. The driver 13 of the software domain 10 may drive the memory device 100 to operate as an operator in the form of an operation code (OP code) corresponding to the operator operation. According to the memory device 100 according to the present example, the memory device 100 may be used as a general memory device in which the operator operation is excluded. In addition, storing for data used in an operator may be performed through the general memory write operation, and reading for data generated by an operator may be performed through the general memory read operation. The memory write operation for the data used in the operator and the memory read operation for the data generated by the operator may be performed through the operating system 12 without passing through the driver 13 in the software domain 10.

The request processing circuit 300 of the memory device 100 may include a memory ready circuit 310, an operation ready circuit 320, a memory request queue 330, an operation request queue 340, a mode control circuit 350, and an arbiter 360.

The memory ready circuit 310 may receive the memory request M_REQ requesting the memory operation of the memory-operator unit 200 from the operating system 12 of the software domain 10. The memory ready circuit 310 may receive a first queue flag signal Q_FLAG1 from the mode control circuit 350. The memory ready circuit 310 may allow or block the output of the memory request M_REQ, based on the first queue flag signal Q_FLAG1. In an example, when the first queue flag signal Q_FLAG1 has a first logic level (e.g., a binary value of "1"), the memory ready circuit 310 may allow the memory request M_REQ to be transmitted to the memory request queue 330. On the other hand, when the first queue flag signal Q_FLAG1 has a second logic level (e.g., a binary value of "0"), the memory ready circuit 310 may block the transmission of the memory request M_REQ to the memory request queue 330.

The operation ready circuit 320 may receive the operation request OP_REQ requesting the operator operation of the memory-operator unit 200 from the driver 13 of the software domain 10. The operation ready circuit 320 may receive a second queue flag signal Q_FLAG2 from the mode control circuit 350. The operation ready circuit 320 may allow or block the output of the operation request OP_REQ, based on the second queue flag signal Q_FLAG2. In an example, when the second queue flag signal Q_FLAG2 has the first logic level (e.g., the binary value of "1"), the operation ready circuit 320 may allow the operation request OP_REQ to be transmitted to the operation request queue 340. On the other hand, when the second queue flag signal Q_FLAG2 has the second logic level (e.g., the binary value of "0"), the operation ready circuit 320 may block the transmission of the operation request OP_REQ to the operation request queue 340.

The memory request queue 330 may store the memory requests M_REQs transmitted through the memory ready circuit 310. To this end, the memory request queue 330 may include a plurality of storage regions capable of storing the memory requests M_REQs. The memory request queue 330 may output (dequeue) the memory request M_REQ located in the storage region indicated by a front pointer, among the plurality of storage regions. The memory request queue 330 may store the memory request M_REQ input in the storage region indicated by a rear pointer, among the plurality of storage regions. The memory request queue 330 may output the memory requests M_REQs stored in the plurality of storage regions in the order determined by scheduling. In an example, the memory request queue 330 may output the memory requests M_REQs in the order determined by a re-order method, for example, a first ready-first come first serve (FR-FCFS) method. In this case, in an embodiment, the memory request queue 330 may output the memory requests M_REQs in the order in which the number of row activations of the memory circuits of the memory-operator unit 200 is minimized, while searching for the memory requests M_REQs from the oldest entry, among the memory requests M_REQs stored in the storage regions. The memory request queue 330 may transmit the memory request M_REQ to the arbiter 360.

The memory request queue 330 may generate a memory queue status signal MQ_STAT including the status information of the memory request queue 330 to transmit the memory queue status signal MQ_STAT to the mode control circuit 350. The memory request queue 330 may output the memory queue status signal MQ_STAT in synchronization with a time point at which the memory request M_REQ is transmitted from the memory ready circuit 310 and a time point at which the memory request M_REQ is output. The memory queue status signal MQ_STAT may include information on whether the memory request M_REQ is transmitted to the memory request queue 330. The memory queue status signal MQ_STAT may include information on whether the memory request M_REQ is output from the memory request queue 330. In addition, the memory queue status signal MQ_STAT may include information on the status of the storage regions of the memory request queue 330, for example, whether all storage regions of the memory request queue 330 are filled with the memory requests M_REQs, that is, the memory request queue 330 is in a "full status", and whether all storage regions of the memory request queue 330 are empty, that is, the memory request queue 330 is in an "empty status".

The operation request queue 340 may store the operation requests OP_REQs transmitted through the operation ready circuit 320. To this end, the operation request queue 340 may include a plurality of storage regions capable of storing the operation requests OP_REQs. The operation request queue 340 may output (dequeue) the operation request OP_REQ located in the storage region indicated by the front pointer, among the plurality of storage regions. The operation request queue 340 may store the operation request OP_REQ input to the storage region indicated by the rear pointer, among the plurality of storage regions. The operation request queue 340 may output the operation requests OP_REQs stored in the plurality of storage regions in the in-order method, for example, in the first in-first-out (FIFO) method. Accordingly, the operation request queue 340 may output the operation requests OP_REQs in the order of being transmitted to the operation request queue 340 with respect to the operation requests OP_REQs stored in the storage regions. That is, the operation request OP_REQ first transmitted to the operation request queue 340 may be output from the operation request queue 340 before the operation request OP_REQ transmitted to the operation request queue 340 later. The operation request queue 340 may transmit the operation request OP_REQ to the arbiter 360.

The operation request queue 340 may generate an operation queue status signal OPQ_STAT including the status information of the operation request queue 340 to transmit the operation queue status signal OPQ_STAT to the mode control circuit 350. The operation request queue 340 may output the operation queue status signal OPQ_STAT in synchronization with a time point at which the operation request OP_REQ is transmitted from the operation ready circuit 320 and a time point at which the operation request OP_REQ is output. The operation queue status signal OPQ_STAT may include information on whether the operation request OP_REQ is transmitted to the operation request queue 340. The operation queue status signal OPQ_STAT may include information on whether the operation request OP_REQ is output from the operation request queue 340. In addition, the operation queue status signal OPQ_STAT may include information on the status of the storage regions of the operation request queue 340, for example, whether all storage regions of the operation request queue 340 are filled with the operation requests OP_REQs, that is, the operation request queue 340 is in a full status, and whether all storage regions of the operation request queue 340 are empty, that is, the operation request queue 340 is in an empty status.

The mode control circuit 350 may receive the memory queue status signal MQ_STAT from the memory request queue 330, and receive the operation queue status signal OPQ_STAT from the operation request queue 340. The mode control circuit 350 may generate and output the first queue flag signal Q_FLAG1, the second queue flag signal Q_FLAG2, and a mode signal MODE, based on the memory queue status signal MQ_STAT and the operation queue status signal OPQ_STAT. The mode control circuit 350 may transmit the first queue flag signal Q_FLAG1 to the memory ready circuit 310. The mode control circuit 350 may transmit the second queue flag signal Q_FLAG2 to the operation ready circuit 320. The mode control circuit 350 may transmit the mode signal MODE to the arbiter 360.

The mode control circuit 350 may transmit the first queue flag signal Q_FLAG1 having the first logic level (i.e., the binary value of "1") to the memory ready circuit 310 when the status of the memory request queue 330 according to the memory queue status signal MQ_STAT and the status of the operation request queue 340 according to the operation queue status signal OPQ_STAT satisfy all three conditions. Here, the first condition among the three conditions may be satisfied when the memory request queue 330 is not in the full status. The second condition among the three conditions may be satisfied when the operation request OP_REQ is not input to the operation request queue 340. The third condition among the three conditions may be satisfied when the operation request queue 340 is in the empty status. When the first queue flag signal Q_FLAG1 having the first logic level (i.e., the binary value of "1") is transmitted, the memory ready circuit 310 may transmit the memory request M_REQ to the memory request queue 330.

The mode control circuit 350 may transmit the first queue flag signal Q_FLAG1 having the second logic level (i.e., the binary value of "0") to the memory ready circuit 310 when the status of the memory request queue 330 according to the memory queue status signal MQ_STAT and the status of the operation request queue 340 according to the operation queue status signal OPQ_STAT satisfy one of three conditions. Here, the first condition among the three conditions may be satisfied when the memory request queue 330 is in the full status. The second condition among the three conditions may be satisfied when the operation request OP_REQ is input to the operation request queue 340. The third condition among the three conditions may be satisfied when the operation request queue 340 is not in the empty status. When the first queue flag signal Q_FLAG1 having the second logic level (i.e., the binary value of "0") is transmitted, the memory ready circuit 310 might not transmit the memory request M_REQ to the memory request queue 330. In this case, the memory request M_REQ that is not transmitted may be transmitted to the memory request queue 330 after the time point at which the first queue flag signal Q_FLAG1 having the first logic level (i.e., the binary value of "1") is transmitted from the mode control circuit 350 to the memory ready circuit 310.

The mode control circuit 350 may transmit the second queue flag signal Q_FLAG2 having the first logic level (i.e., the binary value of "1") to the operation ready circuit 320 when the operation request queue 340 is not in the full status according to the operation queue status signal OPQ_STAT. When the second queue flag signal Q_FLAG2 having the first logic level (i.e., the binary value of "1") is transmitted, the operation ready circuit 320 may transmit the operation request OP_REQ transmitted from the driver 13 of the software domain 10 to the operation request queue 340. The mode control circuit 350 may transmit the second queue flag signal Q_FLAG2 having the second logic level (i.e., the binary value of "0") to the operation ready circuit 320 when the operation request queue 340 is in the full status according to the operation queue status signal OPQ_STAT. When the second queue flag signal Q_FLAG2 having the second logic level (i.e., the binary value of "0") is transmitted, the operation ready circuit 320 might not transmit the operation request OP_REQ transmitted from the driver 13 of the software domain 10 to the operation request queue 340. In this case, the operation request OP_REQ that is not transmitted may be transmitted to the operation request queue 340 after the time point at which the second queue flag signal Q_FLAG2 having the first logic level (i.e., the binary value of "1") is transmitted from the mode control circuit 350 to the operation ready circuit 320.

The mode control circuit 350 may generate a memory mode signal as the mode signal MODE to transmit the memory mode signal to the arbiter 360 when the operation request queue 340 is in the empty status according to the operation queue status signal OPQ_STAT. The mode control circuit 350 may generate the memory mode signal as the mode signal MODE to transmit the memory mode signal to the arbiter 360 even when the memory request queue 330 is not in the empty status according to the memory queue status signal MQ_STAT, even though the operation request queue 340 is not in the empty status according to the operation queue status signal OPQ_STAT. On the other hand, the mode control circuit 350 may generate an operator mode signal as the mode signal MODE to transmit the operator mode signal to the arbiter 360 when the operation request queue 340 is not in the empty status according to the operation queue status signal OPQ_STAT and the memory request queue 330 is in the empty status according to the memory queue status signal MQ_STAT.

The arbiter 360 may receive the memory request M_REQ output from the memory request queue 330 and the operation request OP_REQ output from the operation request queue 340. The arbiter 360 may receive the mode signal MODE from the mode control circuit 350. The arbiter 360 may output the memory request M_REQ or the operation request OP_REQ, based on the mode signal MODE. When the mode signal MODE is the memory mode signal, the arbiter 360 may output the memory request M_REQ prior to the operation request OP_REQ. On the other hand, when the mode signal MODE is the operator mode signal, the arbiter 360 may output the operation request OP_REQ prior to the memory request M_REQ.

Figure 2:
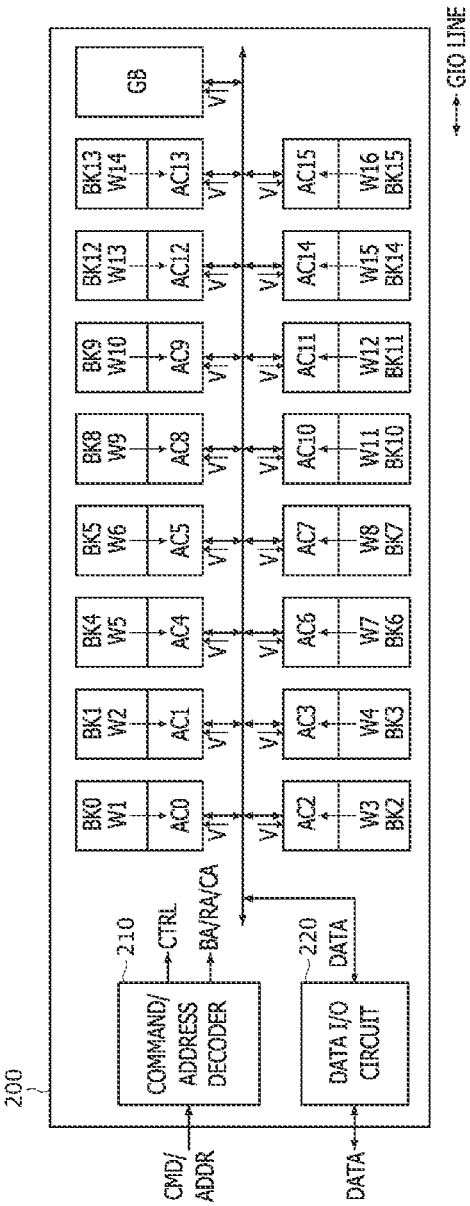
FIG. 2 illustrates an example of a memory-operator unit included in the memory device of FIG. 1.

FIG. 2 illustrates an example of the memory-operator unit 200 included in the memory device 100 of FIG. 1.

Referring to FIG. 2, the memory-operator unit 200 may include a plurality of memory circuits (e.g., first to sixteenth memory circuits BK0-BK15 and a global buffer GB) and a plurality of operating circuits (e.g., first to sixteenth operating circuits AC0-AC15). In an example, the first to sixteenth memory circuits BK0-BK15 may be memory banks constituting a DRAM device. In an example, the first to sixteenth operating circuits AC0-AC15 may be accumulation-and-multiplication (MAC) circuits. However, this is only one example, and the plurality of memory circuits and the plurality of operating circuits may be configured in various ways.

The memory-operator unit 200 may include a command/address decoder 210 that decodes the command CMD and address ADDR transmitted from the request processing circuit (300 of FIG. 1) to generate and output a control signal CTRL and a bank address/row address/column address BA/RA/CA. The command CMD may include the memory command (M_CMD of FIG. 1) and the operation command (OP_CMD of FIG. 1), as described with reference to FIG. 1. The memory-operator unit 200 may include a data input/output (I/O) circuit 220 that performs a data transmission operation and a data reception operation with the request processing circuit (300 of FIG. 1). Although not shown in FIG. 2, the control signal CTRL and the bank address/row address/column address BA/RA/CA output from the command/address decoder 210 may be transmitted to the first to sixteenth memory circuits BK0-BK15, the global buffer GB, and the first to sixteenth operating circuits AC0-AC15 through control signal transmission lines. The data input/output circuit 220 may transmit data DATA to the first to sixteenth memory circuits BK0-BK15, the global buffer GB, and the first to sixteenth operating circuits AC0-AC15, or receive the data DATA from the first to sixteenth memory circuits BK0-BK15, the global buffer GB, and the first to sixteenth operating circuits AC0-AC15 through a global input/output (hereinafter, referred to "GIO") line.

The first to sixteenth memory circuits BK0-BK15 may be combined 1:1 to the first to sixteenth operating circuits AC0-AC15. For example, the first memory circuit BK0 may be combined to the first operating circuit AC0. The second memory circuit BK1 may be combined to the second operating circuit AC1. Similarly, the sixteenth memory circuit BK15 may be combined to the sixteenth operating circuit AC15. On the other hand, the global buffer GB may be commonly combined to the first to sixteenth operating circuits AC0-AC15. However, this is only one example, and in another example, at least two memory circuits may be combined to one operating circuit.

Although omitted in FIG. 2, the first to sixteenth memory circuits BK0-BK15 may perform a data transmission operation through the GIO line. The data transmission operation by the first to sixteenth memory circuits BK0-BK15 may be divided into a memory operation and an operator operation. The memory operation of the first to sixteenth memory circuits BK0-BK15 may include a data write operation of storing the data transmitted through the data input/output circuit 220 and the GIO line and a data read operation of outputting the stored data through the GIO line and the data input/output circuit 220. The first to sixteenth memory circuits BK0-BK15 may store the operation data, for example, first to sixteenth weight data W1-W16 transmitted through the data input/output circuit 220 and the GIO line, through the data write operation.

The operator operation of the first to sixteenth memory circuits BK0-BK15 may be performed by providing the operation data, for example, the first to sixteenth weight data W1-W16 to the first to sixteenth operating circuits AC0-AC15 through the GIO line. In this case, a memory circuit may provide the weight data to a corresponding operating circuit combined to the memory circuit. For example, the first memory circuit BK0 may transmit the first weight data W1 to the first operating circuit AC0 through the GIO line. The second memory circuit BK1 may transmit the second weight data W2 to the second operating circuit AC1 through the GIO line. Similarly, the sixteenth memory circuit BK15 may transmit the sixteenth weight data W16 to the sixteenth operating circuit AC15 through the GIO line. The operator operation of the first to sixteenth memory circuits BK0-BK15 may be performed by receiving and storing operation result data output from the first to sixteenth operating circuits AC0-AC15 through the GIO line.

The global buffer GB may also perform a data transmission operation through the GIO line. Accordingly, the global buffer GB may store operation data, for example, vector data V transmitted through the data input/output circuit 220 and the GIO line. The global buffer GB may provide the operation data, for example, the vector data V to the first to sixteenth operating circuits AC0-AC15 through the GIO line. The vector data V output from the global buffer GB may be commonly transmitted to the first to sixteenth operating circuits AC0-AC15 through the GIO line.

The first to sixteenth operating circuits AC0-AC15 may perform operations using the first to sixteenth weight data W1-W16 transmitted from the first to sixteenth memory circuits BK0-BK15 and the vector data V transmitted from the global buffer GB. For example, the first operating circuit AC0 may perform a first operation for the first weight data W1 and the vector data V transmitted from the first memory circuit BK0 and the global buffer GB, respectively. The second operating circuit AC1 may perform a second operation for the second weight data W2 and the vector data V transmitted from the second memory circuit BK1 and the global buffer GB, respectively. Similarly, the sixteenth operating circuit AC15 may perform a sixteenth operation for the sixteenth weight data W16 and the vector data V transmitted from the sixteenth memory circuit BK15 and the global buffer GB, respectively. The first to sixteenth operating circuits AC0-AC15 may transmit the operation result data generated as a result of the operations to the first to sixteenth memory circuits BK0-BK15 or to the data input/output circuit 220.

Figure 3:
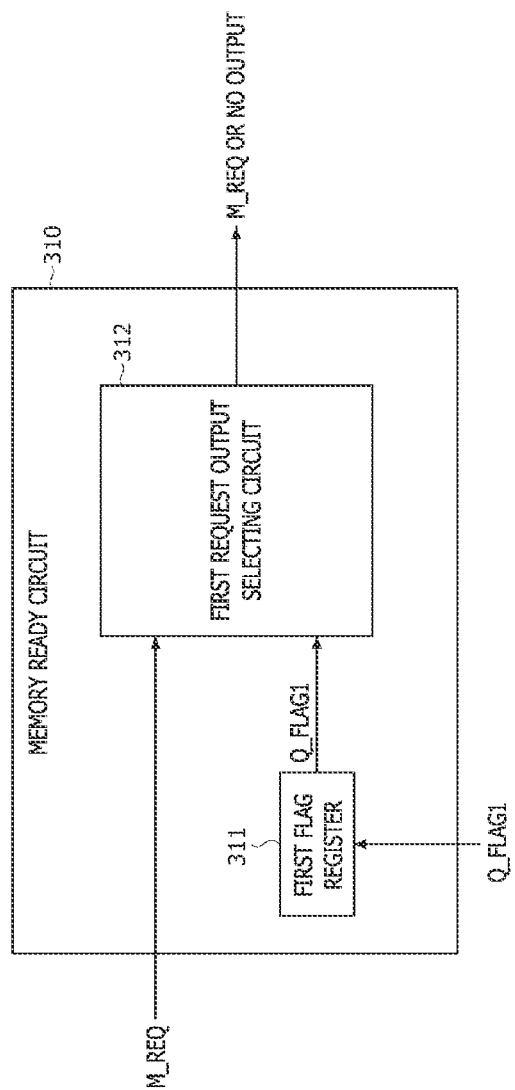
FIG. 3 is a block diagram illustrating an example of a memory ready circuit of a request processing circuit included in the memory device of FIG. 1.

FIG. 3 is a block diagram illustrating an example of the memory ready circuit 310 of the request processing circuit 300 included in the memory device 100 of FIG. 1. In addition, FIG. 4 is a flowchart illustrating an operation of the memory ready circuit 310 of FIG. 3.

Referring first to FIG. 3, the memory ready circuit 310 may include a first flag register 311 and a first request output selecting circuit 312. The first flag register 311 may store the first queue flag signal Q_FLAG1 transmitted from the mode control circuit (350 of FIG. 1). The first flag register 311 may transmit the stored first queue flag signal Q_FLAG1 to the first request output selecting circuit 312. In an example, the first flag register 311 may transmit the first queue flag signal Q_FLAG1 to the first request output selecting circuit 312 at a time point at which the memory request M_REQ is input to the memory ready circuit 310. In another example, when the first queue flag signal Q_FLAG1 is transmitted to the first flag register 311, the first flag register 311 may transmit the first queue flag signal Q_FLAG1 to the first request output selecting circuit 312 regardless of whether the memory request M_REQ is input. The first request output selecting circuit 312 may receive the memory request M_REQ from the operating system (12 of FIG. 1) of the software domain (10 of FIG. 1). The first request output selecting circuit 312 may allow the output of the memory request M_REQ or block the output of the memory request M_REQ, based on a logic level (or value) of the first queue flag signal Q_FLAG1 transmitted from the first flag register 311.

Figure 4:
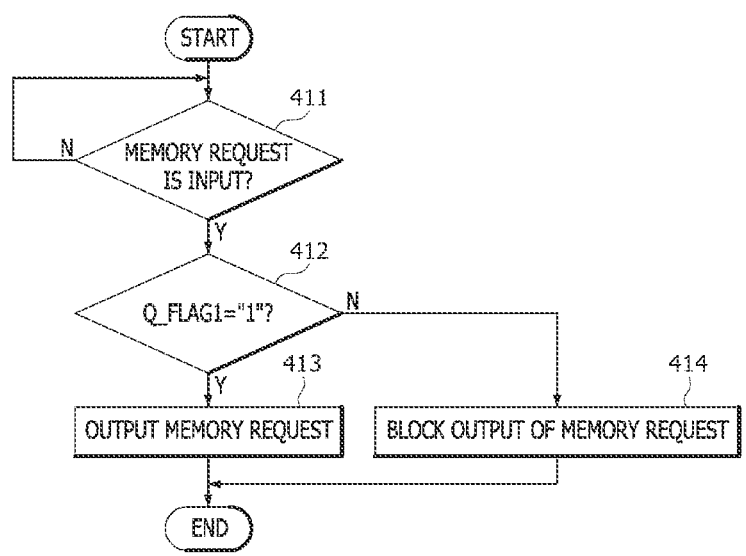
FIG. 4 is a flowchart illustrating an operation of the memory ready circuit of FIG. 3.

In more detail with reference to FIG. 4, together with FIG. 3, in operation 411, the first request output selecting circuit 312 may determine whether the memory request M_REQ is input. The determination in operation 411 may be continued until the memory request M_REQ is input to the first request output selecting circuit 312. When the memory request M_REQ is input to the first request output selecting circuit 312, in operation 412, the first request output selecting circuit 312 may determine whether the first queue flag signal Q_FLAG1 has a first logic level (i.e., a binary value of "1"). In the determination of operation 412, when the first queue flag signal Q_FLAG1 has the first logic level (i.e., the binary value of "1"), in operation 413, the first request output selecting circuit 312 may output the memory request M_REQ. In the determination of operation 412, when the first queue flag signal Q_FLAG1 has a second logic level (i.e., a binary value of "0"), in operation 414, the first request output selecting circuit 312 may block the output of the memory request M_REQ.

Figure 5:
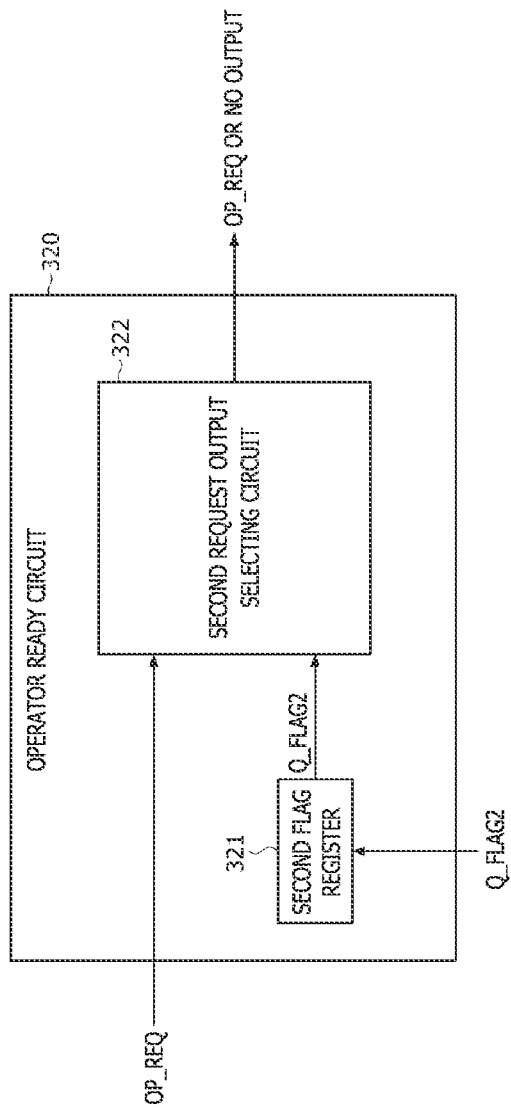
FIG. 5 is a block diagram illustrating an example of an operation ready circuit of the request processing circuit included in the memory device of FIG. 1.

FIG. 5 is a block diagram illustrating an example of the operation ready circuit 320 of the request processing circuit 300 included in the memory device 100 of FIG. 1. In addition, FIG. 6 is a flowchart illustrating an operation of the operation ready circuit 320 of FIG. 5.

Referring first to FIG. 5, the operation ready circuit 320 may include a second flag register 321 and a second request output selecting circuit 322. The second flag register 321 may store the second queue flag signal Q_FLAG2 transmitted from the mode control circuit (350 of FIG. 1). The second flag register 321 may transmit the stored second queue flag signal Q_FLAG2 to the second request output selecting circuit 322. In an example, the second flag register 321 may transmit the second queue flag signal Q_FLAG2 to the second request output selecting circuit 322 at a time point at which the operation request OP_REQ is input to the operation ready circuit 320. In another example, when the second queue flag signal Q_FLAG2 is transmitted to the second flag register 321, the second flag register 321 may transmit the second queue flag signal Q_FLAG2 to the second request output selecting circuit 322 regardless of whether the operation request OP_REQ is input. The second request output selecting circuit 322 may receive the operation request OP_REQ from the driver (13 of FIG. 1) of the software domain (10 of FIG. 1). The second request output selecting circuit 322 may allow the output of the operation request OP_REQ or block the output of the operation request OP_REQ, based on the logic level (or value) of the second queue flag signal Q_FLAG2 transmitted from the second flag register 321.

Figure 6:
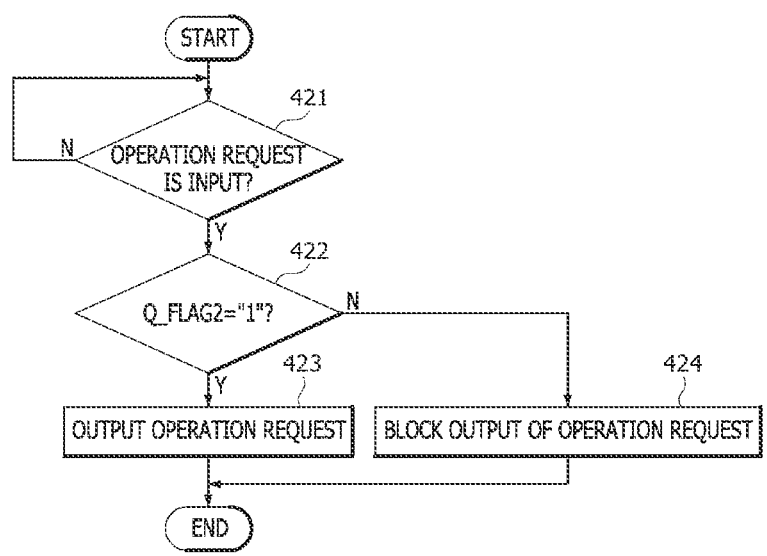
FIG. 6 is a flowchart illustrating an operation of the operation ready circuit of FIG. 5.

In more detail with reference to FIG. 6, together with FIG. 5, in operation 421, the second request output selecting circuit 322 may determine whether the operation request OP_REQ is input. The determination in operation 421 may be continuously performed until the operation request OP_REQ is input to the second request output selecting circuit 322. When the operation request OP_REQ is input to the second request output selecting circuit 322, in operation 422, the second request output selecting circuit 322 may determine whether the second queue flag signal Q_FLAG2 has a first logic level, that is, a binary value of "1". In the determination of operation 422, when the second queue flag signal Q_FLAG2 has the first logic level (i.e., the binary value of "1"), in operation 423, the second request output selecting circuit 322 may output the operation request OP_REQ. In the determination of operation 422, when the second queue flag signal Q_FLAG2 has a second logic level (i.e., a binary value of "0"), in operation 424, the second request output selecting circuit 322 may block the output of the operation request OP_REQ.

FIG. 7 illustrates an example of the memory queue status signal MQ_STAT output from the memory request queue 330 of the request processing circuit 300 included in the memory device 100 of FIG. 1. The memory queue status signal MQ_STAT shown in FIG. 7 is only an example, and various pieces of information may be included in the memory queue status signal MQ_STAT as needed.

Referring to FIG. 7, the memory queue status signal MQ_STAT generated in the memory request queue (330 of FIG. 1) and transmitted to the control mode circuit (350 of FIG. 1) may be constituted with a first binary stream composed of a plurality of binary bits. The first binary stream constituting the memory queue status signal MQ_STAT may include four bits. A first bit, that is, the least significant bit (LSB) of the first binary stream constituting the memory queue status signal MQ_STAT may indicate whether the memory request queue (330 of FIG. 1) is in an empty status. More specifically, when the storage regions of the memory request queue (330 of FIG. 1) are all empty, that is, when there is no memory request M_REQ in the storage regions of the memory request queue (330 of FIG. 1), the first bit of the first binary stream constituting the memory queue status signal MQ_STAT may have a first logic level, that is, a binary value of "1". On the other hand, when the memory request queue (330 of FIG. 1) in not in the empty status, that is, when at least one memory request M_REQ remains in the storage regions of the memory request queue (330 of FIG. 1), the first bit of the first binary stream constituting the memory queue status signal MQ_STAT may have a second logic level, that is, a binary value of "0".

A second bit of the first binary stream constituting the memory queue status signal MQ_STAT may indicate whether the memory request queue (330 of FIG. 1) is in a full status. More specifically, when all of the storage regions of the memory request queue (330 of FIG. 1) are filled with the memory requests M_REQs, the second bit of the first binary stream constituting the memory queue status signal MQ_STAT may have the first logic level, that is, the binary value of "1". On the other hand, when the memory request queue (330 of FIG. 1) is not in the full status, that is, when there is at least one empty storage region without the memory request M_REQ in the memory request queue (330 of FIG. 1), the second bit of the first binary stream constituting the memory queue status signal MQ_STAT may have the second logic level, that is, the binary value of "0".

A third bit of the first binary stream constituting the memory queue status signal MQ_STAT may indicate whether the memory request M_REQ is output (dequeued) from the memory request queue (330 of FIG. 1). More specifically, when the memory request M_REQ is not output from the memory request queue (330 of FIG. 1), the third bit of the first binary stream constituting the memory queue status signal MQ_STAT may have the first logic level, that is, the binary value of "1". On the other hand, when the memory request M_REQ stored in the storage region pointed by a front pointer among the storage regions of the memory request queue (330 of FIG. 1) is output from the memory request queue (330 of FIG. 1), the third bit of the first binary stream constituting the memory queue status signal MQ_STAT may have the second logic level, that is, the binary value of "0".

A fourth bit, that is the most significant bit (MSB) of the first binary stream constituting the memory queue status signal MQ_STAT may indicate whether the memory request M_REQ is input (enqueued) to the memory request queue (330 of FIG. 1). More specifically, when the memory request M_REQ is not input to the memory request queue (330 of FIG. 1), the fourth bit of the first binary stream constituting the memory queue status signal MQ_STAT may have the first logic level, that is, the binary value of "1". On the other hand, when the memory request M_REQ is transmitted to the storage region pointed by a rear pointer among the storage regions of the memory request queue (330 of FIG. 1), the fourth bit of the first binary stream constituting the memory queue status signal MQ_STAT may have the second logic level, that is, the binary value of "0".

Figure 8:
FIG. 8 illustrates an example of an operation queue status signal output from an operation request queue of the request processing circuit included in the memory device of FIG. 1.

FIG. 8 illustrates an example of the operation queue status signal OPQ_STAT output from the operation request queue 340 of the request processing circuit 300 in the memory device 100 of FIG. 1. The operation queue status signal OPQ_STAT shown in FIG. 8 is only one example, and various pieces of information may be included in the operation queue status signal OPQ_STAT as needed.

Referring to FIG. 8, the operation queue status signal OPQ_STAT generated in the operation request queue (340 of FIG. 1) and transmitted to the mode control circuit (350 of FIG. 1) may be constituted with a second binary stream composed of a plurality of binary bits. The second binary stream constituting the operation queue status signal OPQ_STAT may include four bits. A first bit, that is, the least significant bit (LSB) of the second binary stream constituting the operation queue status signal OPQ_STAT may indicate whether the operation request queue (340 of FIG. 1) is in the empty status. More specifically, when the storage regions of the operation request queue (340 of FIG. 1) are all empty, that is, when there is no operation request OP_REQ in the storage regions of the operation request queue (340 of FIG. 1), the first bit of the operation queue status signal OPQ_STAT may have a first logic level, that is, a binary value of "1". On the other hand, when the operation request queue (340 of FIG. 1) is not in the empty status, that is, when at least one operation request OP_REQ remains in the storage regions of the operation request queue (340 of FIG. 1), the first bit of the second binary stream of the operation queue status signal OPQ_STAT may have a second logic level, that is, a binary value of "0".

A second bit of the second binary stream constituting the operation queue status signal OPQ_STAT may indicate whether the operation request queue (340 of FIG. 1) is in the full status. More specifically, when the operation request queue (340 of FIG. 1) is in the full status in which all of the storage regions of the operation request queue (340 of FIG. 1) are filled with the operation requests OP_REQs, the second bit of the second binary stream constituting the operation queue status signal OPQ_STAT may have the first logic level, that is, the binary value of "1". On the other hand, when the operation request queue (340 of FIG. 1) is not in the full status, that is, when there is at least one empty storage region without the operation request OP_REQ in the operation request queue (340 of FIG. 1), the second bit of the second binary stream constituting the operation queue status signal OPQ_STAT may have the second logic level, that is, the binary value of "0".

A third bit of the second binary stream constituting the operation queue status signal OPQ_STAT may indicate whether the operation request OP_REQ is output (dequeued) from the operation request queue (340 of FIG. 1). More specifically, when the memory request M_REQ is not output from the operation request queue (340 of FIG. 1), the third bit of the second binary stream constituting the operation queue status signal OPQ_STAT may have the first logic level, that is, the binary value of "1". On the other hand, when the operation request OP_REQ stored in the storage region pointed by the front pointer among the storage regions of the operation request queue (340 of FIG. 1) is output from the operation request queue (340 of FIG. 1), the third bit of the second binary stream constituting the operation queue status signal OPQ_STAT may have the second logic level, that is, the binary value of "0".

A fourth bit, that is, the most significant bit (MSB) of the second binary stream constituting the operation queue status signal OPQ_STAT may indicate whether the operation request OP_REQ is input (enqueued) to the operation request queue (340 of FIG. 1). More specifically, when the operation request OP_REQ is not input to the operation request queue (340 of FIG. 1), the fourth bit of the second binary stream constituting the operation queue status signal OPQ_STAT may have the first logic level, that is, the binary value of "1". On the other hand, when the operation request OP_REQ is input to the storage region pointed by the rear pointer among the storage regions of the operation request queue (340 of FIG. 1), the fourth bit of the second binary stream constituting the operation queue status signal OPQ_STAT may have the second logic level, that is, the binary value of "0".

Figure 9:
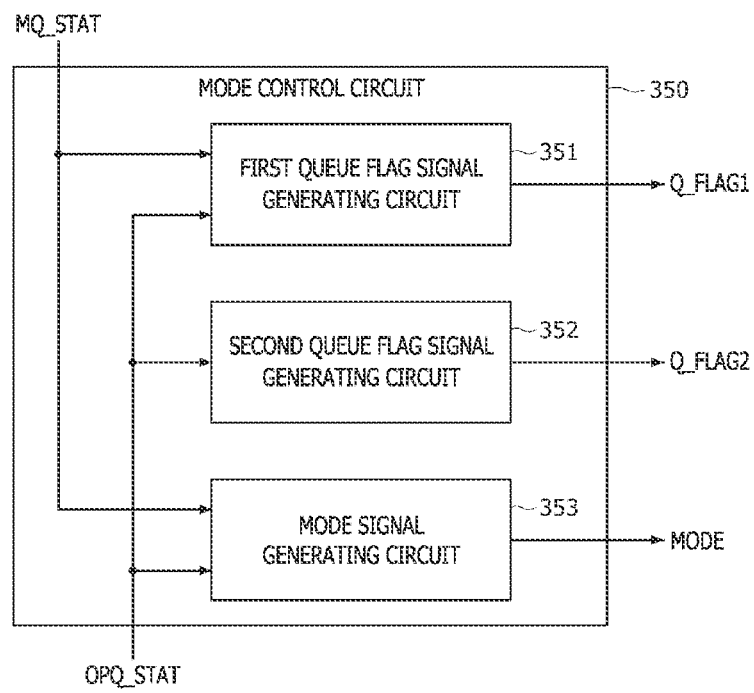
FIG. 9 is a block diagram illustrating an example of a mode control circuit of the request processing circuit included in the memory device of FIG. 1.

FIG. 9 is a block diagram illustrating an example of the mode control circuit 350 of the request processing circuit 300 in the memory device 100 of FIG. 1.

Referring to FIG. 9, the mode control circuit 350 may include a first queue flag signal generating circuit 351, a second queue flag signal generating circuit 352, and a mode signal generating circuit 353. Each of the first queue flag signal generating circuit 351 and the mode signal generating circuit 353 may receive the memory queue status signal MQ_STAT transmitted from the memory request queue (330 of FIG. 1) and the operation queue status signal OPQ_STAT transmitted from the operation request queue (340 of FIG. 1) in common. On the other hand, the second queue flag signal generating circuit 352 may receive the operation queue status signal OPQ_STAT transmitted from the operation request queue (340 of FIG. 1). The first queue flag signal generating circuit 351 may generate the first queue flag signal Q_FLAG1, based on the memory queue status signal MQ_STAT and the operation queue status signal OPQ_STAT to transmit the first queue flag signal Q_FLAG1 to the memory ready circuit (310 of FIG. 1). The second queue flag signal generating circuit 352 may generate the second queue flag signal Q_FLAG2, based on the operation queue status signal OPQ_STAT to generate the second queue flag signal Q_FLAG2 to the operation ready circuit (320 of FIG. 1). The mode signal generating circuit 353 may generate the mode signal MODE, based on the memory queue status signal MQ_STAT and the operation queue status signal OPQ_STAT to transmit the mode signal MODE to the arbiter (360 of FIG. 1).

Figure 10:
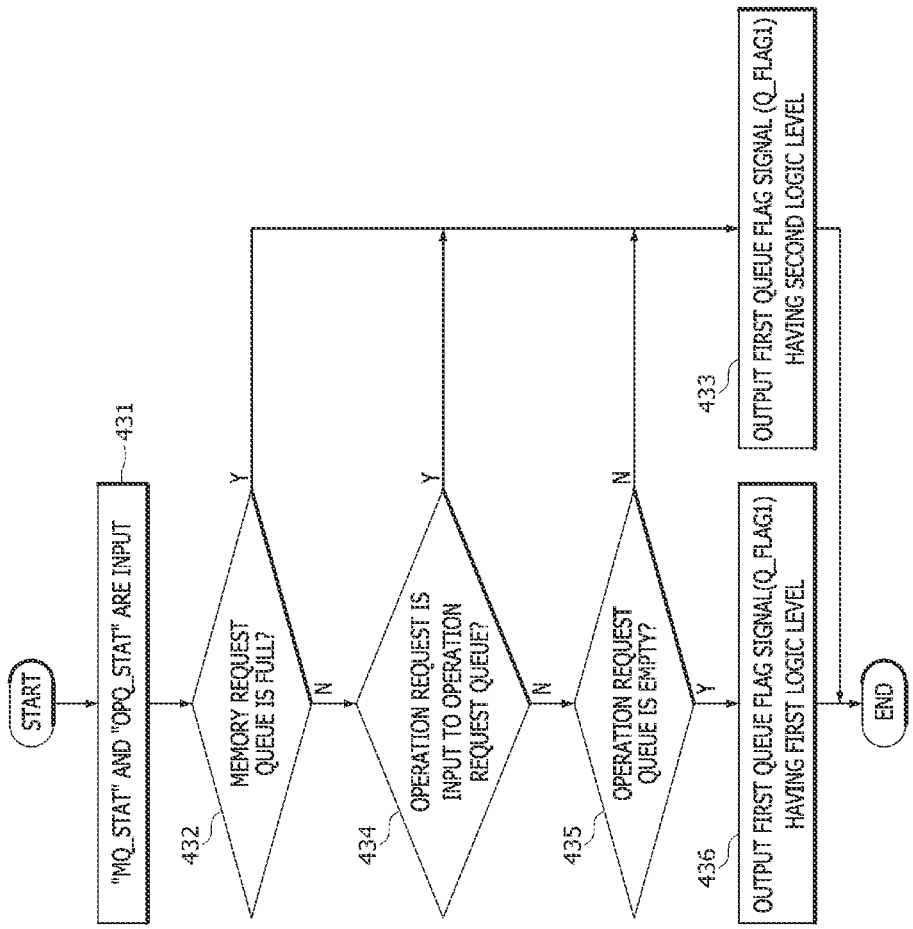
FIG. 10 is a flowchart illustrating an operation of a first queue flag signal generating circuit included in the mode control circuit of FIG. 9.

FIG. 10 is a flowchart illustrating an operation of the first queue flag signal generating circuit 351 included in the mode control circuit 350 of FIG. 9. In the following example, it is assumed that the memory queue status signal MQ_STAT and the operation queue status signal OPQ_STAT are configured the same as those described with reference to FIG. 7 and FIG. 8, respectively.

Referring to FIG. 10, together with FIG. 9, in operation 431, the first queue flag signal generating circuit 351 of the mode control circuit 350 may receive the memory queue status signal MQ_STAT and the operation queue status signal OPQ_STAT. In operation 432, the first queue flag signal generating circuit 351 may determine whether the memory request queue (330 of FIG. 1) is in the full status, based on the memory queue status signal MQ_STAT. When the memory request queue (330 of FIG. 1) is in the full status in the determination in operation 432, that is, as described with reference to FIG. 7, when a second bit of the first binary stream constituting the memory queue status signal MQ_STAT has the first logic level (i.e., the binary value of "1"), in operation 433, the first queue flag signal generating circuit 351 may generate and output the first queue flag signal Q_FLAG1 having the second logic level (i.e., having the binary value of "0"). As described above with reference to FIGS. 3 and 4, when the first queue flag signal Q_FLAG1 having the second logic level (i.e., the binary value of "0") is transmitted, the memory ready circuit 310 may block the transmission of the memory request M_REQ to the memory request queue (330 of FIG. 1).

In the determination of operation 432, when the memory request queue (330 of FIG. 1) is not in the full status, that is, as described with reference to FIG. 7, when the second bit of the first binary stream constituting the memory queue status signal MQ_STAT has the second logic level (i.e., the binary value of "0"), in operation 434, the first queue flag signal generating circuit 351 may determine whether the operation request OP_REQ is input (enqueued) to the operation request queue (340 of FIG. 1), based on the operation queue status signal OPQ_STAT. In the determination of operation 434, when the operation request OP_REQ is input to the operation request queue (340 of FIG. 1), that is, as described with reference to FIG. 8, when the fourth bit of the second binary stream constituting the operation queue status signal OPQ_STAT has the second logic level (i.e., the binary value of "0"), the first queue flag signal generating circuit 351 may generate and output the first queue flag signal Q_FLAG1 having the second logic level (i.e., the binary value of "0").

In the determination of operation 434, when the operation request OP_REQ is not input to the operation request queue (340 of FIG. 1), that is, as described with reference to FIG. 8, when the fourth bit of the second binary stream constituting the operation queue status signal OPQ_STAT has the first logic level (i.e., the binary value of "1"), in operation 435, the first queue flag signal generating circuit 351 may determine whether the operation request queue (340 of FIG. 1) is in the empty status. When the operation request queue (340 of FIG. 1) is not in the empty status in the determination of operation 435, that is, as described with reference to FIG. 8, when the first bit of the second binary stream constituting the operation queue status signal OPQ_STAT has the second logic level (i.e., the binary value of "0"), the first queue flag signal generating circuit 351 may generate and output the first queue flag signal Q_FLAG1 having the second logic level (i.e., the binary value of "0") in operation 433. In the determination of operation 435, when the operation request queue (340 of FIG. 1) is in the empty status, that is, as described with reference FIG. 8, when the first bit of the second binary stream constituting the operation queue status signal OPQ_STAT has the first logic level (i.e., the binary value of "1"), the first queue flag signal generating circuit 351 may generate and output the first queue flag signal Q_FLAG1 having the first logic level (i.e., the binary value of "1") in operation 436.

As described above, when the memory request queue (330 of FIG. 1) is not in the full status, the operation request OP_REQ is not input to the operation request queue (340 of FIG. 1), and the operation request queue (340 of FIG. 1) is in the empty status, the first queue flag signal generating circuit 351 may generate the first queue flag signal Q_FLAG1 having the first logic level (i.e., the binary value of "1") and transmit the first queue flag signal Q_FLAG1 to the memory ready circuit (310 of FIG. 1). In this case, the memory request M_REQ may be transmitted from the memory ready circuit (310 of FIG. 1) to the memory request queue (330 of FIG. 1). On the other hand, when the memory request queue (330 of FIG. 1) is in the full status, the operation request OP_REQ is input to the operation request queue (340 of FIG. 1), or the operation request queue (340 of FIG. 1) is not in the empty status, the first queue flag signal generating circuit 351 may generate the first queue flag signal Q_FLAG1 having the second logic level (i.e., the binary value of "0") and transmit the first queue flag signal Q_FLAG1 to the memory ready circuit (310 of FIG. 1). In this case, the transmission of the memory request M_REQ from the memory ready circuit (310 of FIG. 1) to the memory request queue (330 of FIG. 1) may be blocked.

Figure 11:
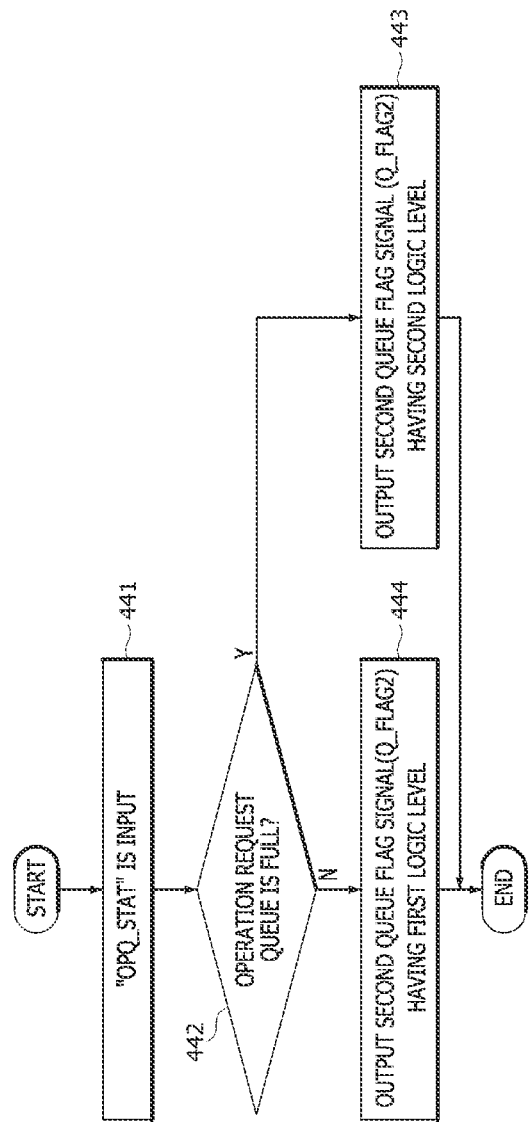
FIG. 11 is a flowchart illustrating an operation of a second queue flag signal generating circuit included in the mode control circuit of FIG. 9.

FIG. 11 is a flowchart illustrating an operation of the second queue flag signal generating circuit 352 included in the mode control circuit 350 of FIG. 9. In the following example, it is assumed that the memory queue status signal MQ_STAT and the operation queue status signal OPQ_STAT are configured the same as those described with reference to FIG. 7 and FIG. 8, respectively.

Referring to FIG. 11, together with FIG. 9, in operation 441, the second queue flag signal generating circuit 352 of the mode control circuit 350 may receive the operation queue status signal OPQ_STAT. In operation 442, the second queue flag signal generating circuit 352 may determine whether the operation request queue (340 of FIG. 1) is in a full status, based on the operation queue status signal OPQ_STAT. In the determination of operation 442, when the operation request queue (340 of FIG. 1) is in the full status, that is, as described with reference to FIG. 8, when the second bit of the second binary stream constituting the operation queue status signal MQ_STAT has the first logic level (i.e., the binary value of "1"), in operation 443, the second queue flag signal generating circuit 352 may generate and output the second queue flag signal Q_FLAG2 having the second logic level (i.e., the binary value of "0"). As described above with reference to FIGS. 5 and 6, when the second queue flag signal Q_FLAG2 having the second logic level (i.e., the binary value of "0") is transmitted, the operation ready circuit 320 may block the transmission of the operation request OP_REQ to the operation request queue (340 of FIG. 1).

In the determination of operation 442, when the operation request queue (340 of FIG. 1) is not in the full status, that is, as described with reference to FIG. 8, the second bit of the second binary stream constituting the operation queue status signal OPQ_STAT has the second logic level (i.e., the binary value of "0"), in operation 444, the second queue flag signal generating circuit 352 may generate and output the second queue flag signal Q_FLAG2 having the first logic level (i.e., the binary value of "1"). As described above with reference to FIGS. 5 and 6, when the second queue flag signal Q_FLAG2 having the first logic level (i.e., the binary value of "1") is transmitted, the operation ready circuit 320 may transmit the operation request OP_REQ to the operation request queue (340 of FIG. 1).

Figure 12:
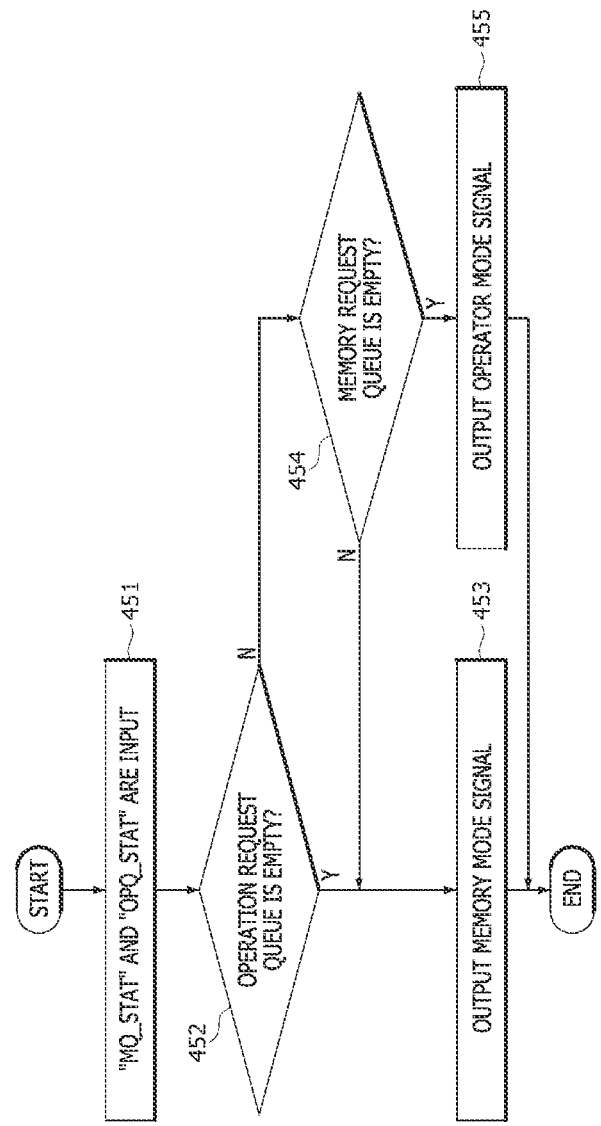
FIG. 12 is a flowchart illustrating an operation of a mode signal generating circuit included in the mode control circuit of FIG. 9.

FIG. 12 is a flowchart illustrating an operation of the mode signal generating circuit 353 included in the mode control circuit 350 of FIG. 9. In the following example, it is assumed that the memory queue status signal MQ_STAT and the operation queue status signal OPQ_STAT are configured the same as those described with reference to FIG. 7 and FIG. 8, respectively.

Referring to FIG. 12, together with FIG. 9, in operation 451, the mode signal generating circuit 353 of the mode control circuit 350 may receive the memory queue status signal MQ_STAT and the operation queue status signal OPQ_STAT. In operation 452, the mode signal generating circuit 353 may determine whether the operation request queue (340 of FIG. 1) is in an empty status, based on the operation queue status signal OPQ_STAT. In the determination of operation 452, when the operation request queue (340 of FIG. 1) is in the empty status, that is, as described with reference to FIG. 8, when the first bit of the second binary stream constituting the operation queue status signal OPQ_STAT has the first logic level (i.e., the binary value of "1"), in operation 453, the mode signal generating circuit 353 may generate a memory mode signal as the mode signal MODE and transmit the memory mode signal to the arbiter (360 of FIG. 1). In the determination of operation 452, when the operation request queue (340 of FIG. 1) is not in the empty status, that is, as described with reference to FIG. 8, when the first bit of the second binary stream constituting the operation queue status signal OPQ_STAT has the second logic level (i.e., the binary value of "0"), in operation 454, the mode signal generating circuit 353 may determine whether the memory request queue (330 of FIG. 1) is in the empty status.

When the memory request queue (330 of FIG. 1) is not in the empty status, that is, as described with reference to FIG. 8, when the first bit of the first binary stream constituting the memory queue status signal MQ_STAT has the second logic level (i.e., the binary value of "0") in operation 454, the mode signal generating circuit 353 may generate the memory mode signal as the mode signal MODE and transmit the memory mode signal to the arbiter (360 of FIG. 1), in operation 453. When the memory request queue (330 of FIG. 1) is in the empty status, that is, as described with reference to FIG. 8, when the first bit of the first binary stream constituting the memory queue status signal MQ_STAT has the first logic level (i.e., the binary value of "1") in operation 454, the mode signal generating circuit 353 may generate an operator mode signal as the mode signal MODE and transmit the operator mode signal to the arbiter (360 of FIG. 1), in operation 455.

Figure 13:
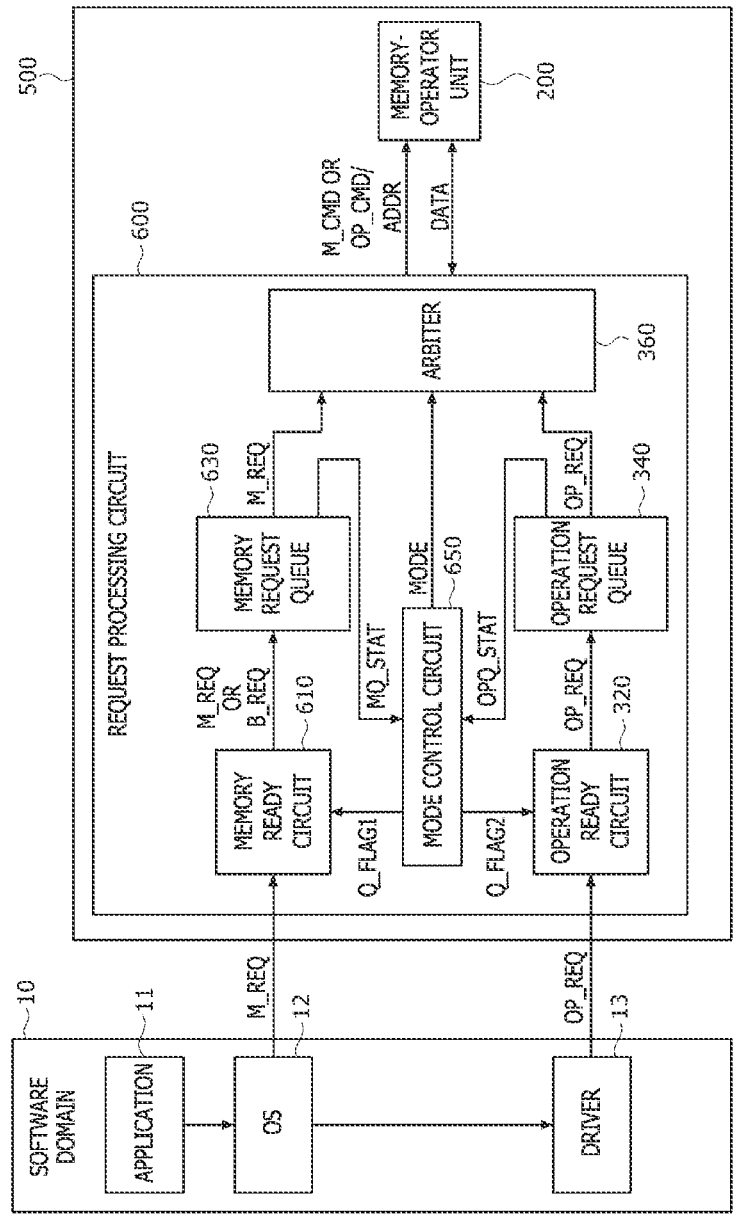
FIG. 13 is a block diagram illustrating a memory device according to an embodiment of the present disclosure, together with a software domain.

FIG. 13 is a block diagram illustrating a memory device 500 according to an embodiment of the present disclosure, together with a software domain 10. In FIG. 13, the same reference numerals as those in FIG. 1 denote the same components, and duplicate descriptions will be omitted below.

Referring to FIG. 13, the memory device 500 may include a memory-operator unit 200 and a request processing circuit 600. The request processing circuit 600 may include a memory ready circuit 610, an operation ready circuit 320, a memory request queue 630, an operation request queue 340, a mode control circuit 650, and an arbiter 360. The contents described with reference to FIGS. 1 to 12 may be equally applied to the operation ready circuit 320, the operation request queue 340, and the arbiter 360.

The memory ready circuit 610 of the request processing circuit 600 may receive a memory request M_REQ requesting a memory operation of the memory-operator unit 200 from an operating system 12 of the software domain 10. The memory ready circuit 610 may receive a first queue flag signal Q_FLAG1 from the mode control circuit 650. The memory ready circuit 610 may output the memory request M_REQ or output a barrier request B_REQ, based on the first queue flag signal Q_FLAG1. In an example, when the first queue flag signal Q_FLAG1 has a first logic level (e.g., a binary value of "1"), the memory ready circuit 610 may transmit the memory request M_REQ to the memory request queue 630. On the other hand, when the first queue flag signal Q_FLAG1 has a second logic level (e.g., a binary value of "0"), the memory ready circuit 610 may transmit the barrier request B_REQ to the memory request queue 630. The barrier request B_REQ may be stored in the memory ready circuit 610 and include information requesting the memory request queue 630 to stop outputting the memory request M_REQ.

The memory request queue 630 may store the memory request M_REQ or the barrier request B_REQ transmitted from the memory ready circuit 610. The memory request queue 630 may output (dequeue) the memory request M_REQ located in the storage region indicated by a front pointer, among a plurality of storage regions of the memory request queue 630. When the barrier request B_REQ is stored in the storage region pointed by the front pointer, among the storage regions of the memory request queue 630, the memory request queue 630 may process the barrier request B_REQ by removing the barrier request B_REQ from the storage region indicated by the front pointer without outputting the barrier request B_REQ. The memory request queue 630 may stop outputting additional memory request M_REQ after removing the barrier request B_REQ. The memory request queue 630 may store the memory request M_REQ or the barrier request B_REQ input in the storage region pointed by a rear pointer, among the plurality of storage regions. The memory request queue 630 may output the memory requests M_REQs stored in the plurality of storage regions in the order determined by scheduling. In an example, the memory request queue 330 may output the memory requests M_REQs in the order determined by a re-order method, for example, a first ready-first come first serve (FR-FCFS) method. On the other hand, the memory request queue 630 may process the barrier request B_REQ in an in-order method. That is, the barrier requests B_REQs may be processed in the memory request queue 630 in the same order as being input to the memory request queue 630.

The memory request queue 630 may generate a memory queue status signal MQ_STAT including status information of the memory request queue 630 to transmit the memory queue status signal MQ_STAT to the mode control circuit 650. The memory request queue 630 may output the memory queue status signal MQ_STAT in synchronization with a time point when the memory request M_REQ and the barrier request B_REQ are transmitted from the memory ready circuit 610, a time point when the memory request M_REQ is output, and a time point when the barrier request B_REQ is removed. The memory queue status signal MQ_STAT may include information on whether the memory request M_REQ or the barrier request B_REQ is transmitted to the memory request queue 630. The memory queue status signal MQ_STAT may include information on whether the barrier request B_REQ is removed from the memory request queue 630. In addition, the memory queue status signal MQ_STAT may include information on the status of the memory request queue 630, for example, information on whether all storage regions of the memory request queue 630 are filled (i.e., a full status) and whether all storage regions of the memory request queue 630 are empty (i.e., an empty status).

The mode control circuit 650 may receive the memory queue status signal MQ_STAT from the memory request queue 630, and receive the operation queue status signal OPQ_STAT from the operation request queue 340. The operation queue status signal OPQ_STAT may be configured the same as the operation queue status signal OPQ_STAT described with reference to FIG. 8. The mode control circuit 650 may generate and output a first queue flag signal Q_FLAG1, a second queue flag signal Q_FLAG2, and a mode signal MODE, based on the memory queue status signal MQ_STAT and the operation queue status signal OPQ_STAT. The mode control circuit 650 may transmit the first queue flag signal Q_FLAG1 to the memory ready circuit 610. The mode control circuit 650 may transmit the second queue flag signal Q_FLAG2 to the operation ready circuit 320. The mode control circuit 650 may transmit the mode signal MODE to the arbiter 360.

The mode control circuit 650 may transmit the first queue flag signal Q_FLAG1 having a first logic level (i.e., a binary value of "1") to the memory ready circuit 610 when the status of the memory request queue 630 according to the memory queue status signal MQ_STAT and the status of the operation request queue 340 according to the operation queue status signal OPQ_STAT satisfy all three conditions. A first condition among the three conditions may be satisfied when the memory request queue 630 is not in the full status.

A second condition among the three conditions may be satisfied when the operation request OP_REQ is not input to the operation request queue 340. A third condition among the three conditions may be satisfied when the operation request queue 340 is in the empty status. When the first queue flag signal Q_FLAG1 having the first logic level (i.e., the binary value of "1") is transmitted, the memory ready circuit 610 may transmit the memory request M_REQ to the memory request queue 630.

The mode control circuit 650 may transmit the first queue flag signal Q_FLAG1 having a second logic level (i.e., a binary value of "0") to the memory ready circuit 610 when the status of the memory request queue 630 according to the memory queue status signal MQ_STAT and the status of the operation request queue 340 according to the operation queue status signal OPQ_STAT satisfy one of three conditions. A first condition among the three conditions may be satisfied when the memory request queue 630 is in the full status. A second condition among the three conditions may be satisfied when the operation request OP_REQ is input to the operation request queue 340. A third condition among the three conditions may be satisfied when the operation request queue 340 is not in the empty status. When the first queue flag signal Q_FLAG1 having the second logic level (i.e., the binary value of "0") is transmitted, the memory ready circuit 610 may transmit the barrier request B_REQ to the memory request queue 630.

The mode control circuit 650 may transmit the second queue flag signal Q_FLAG2 having the first logic level (i.e., the binary value of "1") to the operation ready circuit 320 when the operation request queue 340 is not in the full status according to the operation queue status signal OPQ_STAT. When the second queue flag signal Q_FLAG2 having the first logic level (i.e., the binary value of "1") is transmitted, the operation ready circuit 320 may transmit the operation request queue OP_REQ transmitted from the driver 13 of the software domain 10 to the operation request queue 340. The mode control circuit 650 may transmit the second queue flag signal Q_FLAG2 having the second logic level (i.e., the binary value of "0") to the operation ready circuit 320 when the operation request queue 340 is in the full status according to the operation queue status signal OPQ_STAT. When the second queue flag signal Q_FLAG2 having the second logic level (i.e., the binary value of "0") is transmitted, the operation ready circuit 320 might not transmit the operation request OP_REQ transmitted from the driver 13 of the software domain 10 to the operation request queue 340. In this case, the operation request OP_REQ that is not transmitted may be transmitted to the operation request queue 340 after the time point when the second queue flag signal Q_FLAG2 having the first logic level (i.e., the binary value of "1") is transmitted from the mode control circuit 650 to the operation ready circuit 320.

The mode control circuit 650 may generate a memory mode signal as the mode signal MODE to transmit the memory mode signal to the arbiter 360 when the operation request queue 340 is in the empty status according to the operation queue status signal OPQ_STAT. The mode control signal 650 may generate the memory mode signal as the mode signal MODE until the barrier request B_REQ is removed from the memory request queue 630 according to the memory queue status signal MQ_STAT to transmit the memory mode signal to the arbiter 360 even through the operation request queue 340 is not in the empty status according to the operation queue status signal OPQ_STAT. On the other hand, the mode control circuit 650 may generate an operator mode signal as the mode signal MODE to transmit the operator mode signal to the arbiter 360 when the operation request queue 340 is not in the empty status according to the operation queue status signal OPQ_STAT and the barrier request B_REQ is removed from the memory request queue 630 according to the memory queue status signal MQ_STAT.

Figure 14:
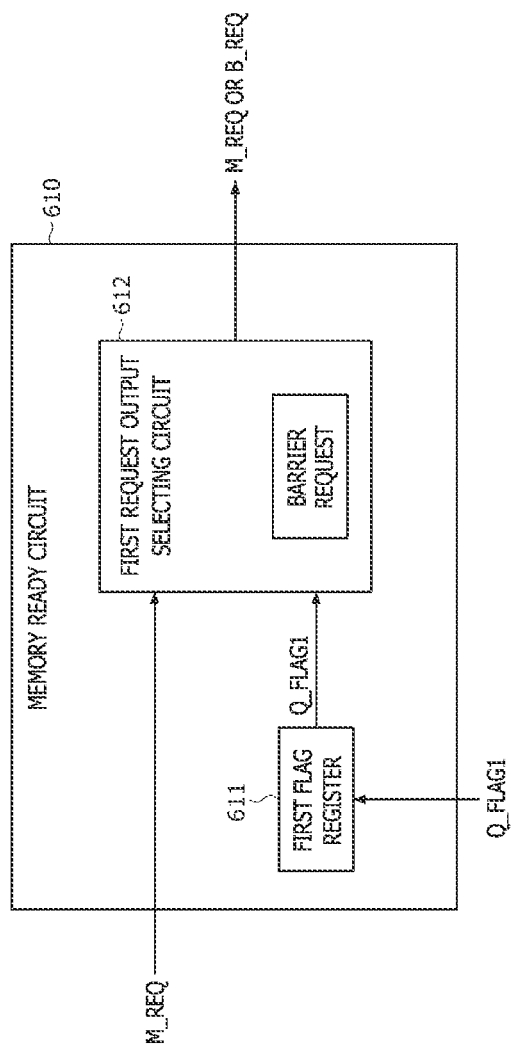
FIG. 14 is a block diagram illustrating an example of a memory ready circuit of a request processing circuit included in the memory device of FIG. 13.

FIG. 14 is a block diagram illustrating an example of the memory ready circuit 610 of the request processing circuit 600 included in the memory device 500 of FIG. 13. In addition, FIG. 15 is a flowchart illustrating an operation of the memory ready circuit 610 of FIG. 14.

Referring first to FIG. 14, the memory ready circuit 610 may include a first flag register 611 and a first request output selecting circuit 612. The first flag register 611 may store the first queue flag signal Q_FLAG1 transmitted from the mode control circuit (650 of FIG. 13). The first flag register 611 may transmit the stored first queue flag signal Q_FLAG1 to the first request output selecting circuit 612. In an example, the first flag register 611 may transmit the first queue flag signal Q_FLAG1 to the first request output selecting circuit 612 at a time point when the memory request M_REQ is input to the memory ready circuit 610. In another example, when the first queue flag signal Q_FLAG1 is transmitted to the first flag register 611, the first flag register 611 may transmit the first queue flag signal Q_FLAG1 to the first request output selecting circuit 612 regardless of whether the memory request M_REQ is input. The first request output selecting circuit 612 may receive the memory request M_REQ from the operating system (12 of FIG. 13) of the software domain (10 of FIG. 13). The first request output selecting circuit 612 may include the barrier request B_REQ itself. The first request output selecting circuit 612 may output the memory request M_REQ or the barrier request B_REQ, based on the logic level (or binary value) of the first queue flag signal Q_FLAG1 transmitted from the first flag register 611.

Figure 15:
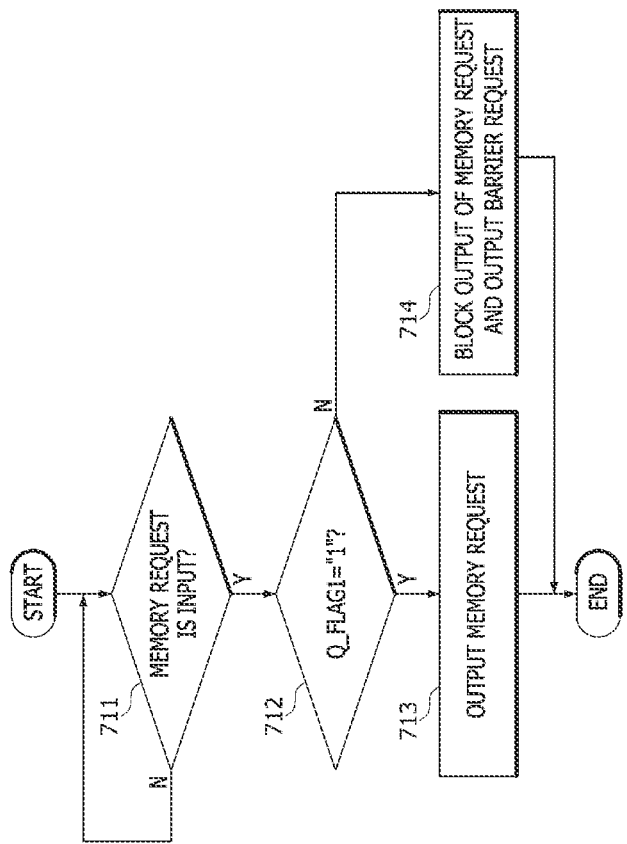
FIG. 15 is a flowchart illustrating an operation of the memory ready circuit of FIG. 14.

In more detail with reference to FIG. 15, together with FIG. 14, in operation 711, the first request output selecting circuit 612 may determine whether the memory request M_REQ is input. The determination of operation 711 may continue until the memory request M_REQ is input to the first request output selecting circuit 612. When the memory request M_REQ is input to the first request output selecting circuit 612, in operation 712, the first request output selecting circuit 612 may determine whether the first queue flag signal Q_FLAG1 has the first logic level, that is, a binary value of "1". In the determination of operation 712, when the first queue flag signal Q_FLAG1 has the first logic level (i.e., the binary value of "1"), the first request output selecting circuit 612 may output the memory request M_REQ in operation 713. In the determination of operation 712, when the first queue flag signal Q_FLAG1 has a second logic level (i.e., a binary value of "0"), in operation 714, the first request output selecting circuit 612 may block the output of the memory request M_REQ and output the barrier request B_REQ.

Figure 16:
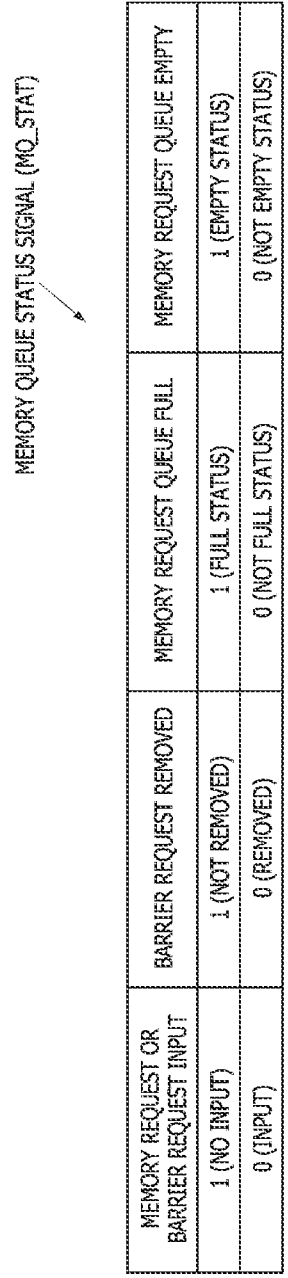
FIG. 16 illustrates an example of a memory queue status signal output from a memory request queue of the request processing circuit included in the memory device of FIG. 13.

FIG. 16 illustrates an example of the memory queue status signal MQ_STAT output from the memory request queue 630 of the request processing circuit 600 included in the memory device 500 of FIG. 13. The memory queue status signal MQ_STAT shown in FIG. 16 is only one example, and various pieces of information may be included in the memory queue status signal MQ_STAT as needed.

Referring to FIG. 16, the memory queue status signal MQ_STAT generated in the memory request queue (630 of FIG. 13) and transmitted to the mode control circuit (650 of FIG. 13) may be constituted with a first binary stream composed of a plurality of binary bits. The first binary stream constituting the memory queue status signal MQ_STAT may include four bits. A first bit, that is, the least significant bit (LSB) of the first binary stream constituting the memory queue status signal MQ_STAT may indicate whether the memory request queue (630 of FIG. 13) is in an empty status. More specifically, when the memory request queue (630 of FIG. 13) is in the empty status, that is, the storage regions of the memory request queue (630 of FIG. 13) are all empty, that is, when there is no memory request M_REQ and no barrier request B_REQ in the memory request queue (630 of FIG. 13), the first bit of the first binary stream constituting the memory queue status signal MQ_STAT may have the first logic level, that is, the binary value of "1". On the other hand, when the memory request queue (630 of FIG. 13) is not in the empty status, that is, when at least one memory request M_REQ or barrier request B_REQ remains in the storage regions of the memory request queue (630 of FIG. 13), the first bit of the memory queue status signal MQ_STAT may have the second logic level, that is, the binary value of "0".

A second bit of the first binary stream constituting the memory queue status signal MQ_STAT may indicate whether the memory request queue (630 of FIG. 13) is in a full status. More specifically, when the memory request queue (630 of FIG. 13) is in the full status, that is, when the storage regions of the memory request queue (630 in FIG. 13) are all filled with the memory requests M_REQs (may include the barrier request B_REQ), the second bit of the memory queue status signal MQ_STAT may have the first logic level, that is, the binary value of "1". On the other hand, when the memory request queue (630 of FIG. 13) is not in the full status, that is, there is at least one empty storage regions without the memory request M_REQ or barrier request B_REQ in the memory request queue (630 of FIG. 13), the second bit of the memory queue status signal MQ_STAT may have the second logic level, that is, the binary value of "0".

A third bit of the first binary stream constituting the memory queue status signal MQ_STAT may indicate whether the barrier request B_REQ is removed from the memory request queue (630 of FIG. 13). More specifically, when the barrier request B_REQ is not removed from the memory request queue (630 of FIG. 13), the third bit of the first binary stream constituting the memory queue status signal MQ_STAT may have the first logic level, that is, the binary value of "1". On the other hand, when the barrier request B_REQ is removed from the storage region indicated by a front point, among the storage regions of the memory request queue (630 of FIG. 13), the third bit of the memory queue status signal MQ_STAT may have the second logic level, that is, the binary value of "0".

A fourth bit, that is, the most significant bit (MSB) of the first binary stream constituting the memory queue status signal MQ_STAT may indicate whether the memory request M_REQ or the barrier request B_REQ is input (enqueued) to the memory request queue (630 of FIG. 13). More specifically, when the memory request M_REQ or the barrier request B_REQ is not input to the memory request queue (630 of FIG. 13), the fourth bit of the first binary stream constituting the memory queue status signal MQ_STAT may have the first logic level, that is, the binary value of "1". On the other hand, when the memory request M_REQ or the barrier request B_REQ is input to the storage region indicated by a rear point, among the storage regions of the memory request queue (630 of FIG. 13), the fourth bit of the memory queue status signal MQ_STAT may have the second logic level, that is, the binary value of "0".

Figure 17:
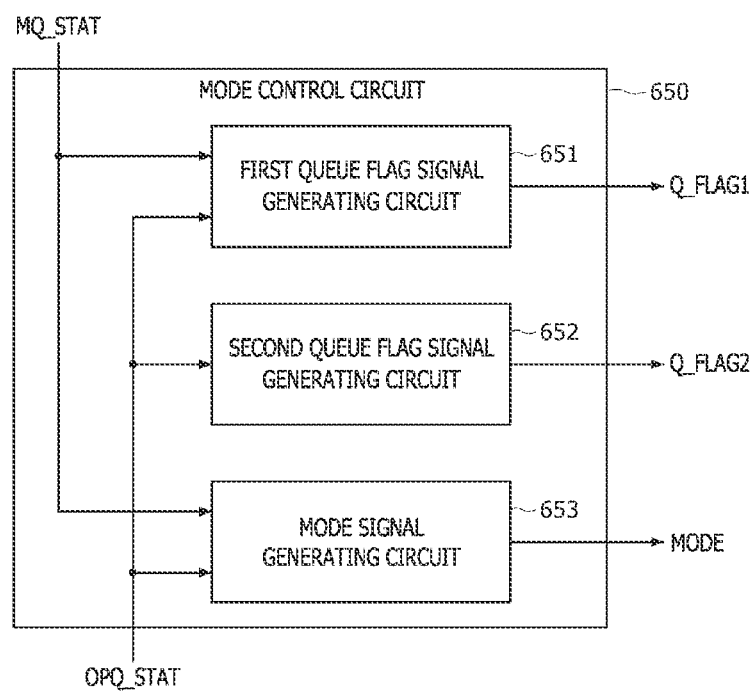
FIG. 17 is a block diagram illustrating an example of a mode control circuit of the request processing circuit included in the memory device of FIG. 13.

FIG. 17 is a block diagram illustrating an example of the mode control circuit 650 of the request processing circuit 600 included in the memory device 500 of FIG. 13.

Referring to FIG. 17, the mode control circuit 650 may include a first queue flag signal generating circuit 651, a second queue flag signal generating circuit 652, and a mode signal generating circuit 653. The first queue flag signal generating circuit 651 and the mode signal generating circuit 653 may commonly receive the memory queue status signal MQ_STAT transmitted from the memory request queue (630 of FIG. 13) and the operation queue status signal OPQ_STAT transmitted from the operation request queue (340 of FIG. 13). On the other hand, the second queue flag signal generating circuit 652 may receive the operation queue status signal OPQ_STAT transmitted from the operation request queue (340 of FIG. 13). The first queue flag signal generating circuit 651 may generate the first queue flag signal Q_FLAG1 to transmit the first queue flag signal Q_FLAG1 to the memory ready circuit (610 of FIG. 13), based on the memory queue status signal MQ_STAT and the operation queue status signal OPQ_STAT. The second queue flag signal generation circuit 652 may generate the second queue flag signal Q_FLAG2 to transmit the second queue flag signal Q_FLAG2 to the operation ready circuit (320 of FIG. 13), based on the operation queue status signal OPQ_STAT. The mode signal generating circuit 653 may generate the mode signal MODE to transmit the mode signal MODE to the arbiter (360 of FIG. 13), based on the memory queue status signal MQ_STAT and the operation queue status signal OPQ_STAT. The operations of the first queue flag signal generating circuit 651 and the second queue flag signal generating circuit 652 may be the same as those described with reference to FIGS. 10 and 11, respectively.

Figure 18:
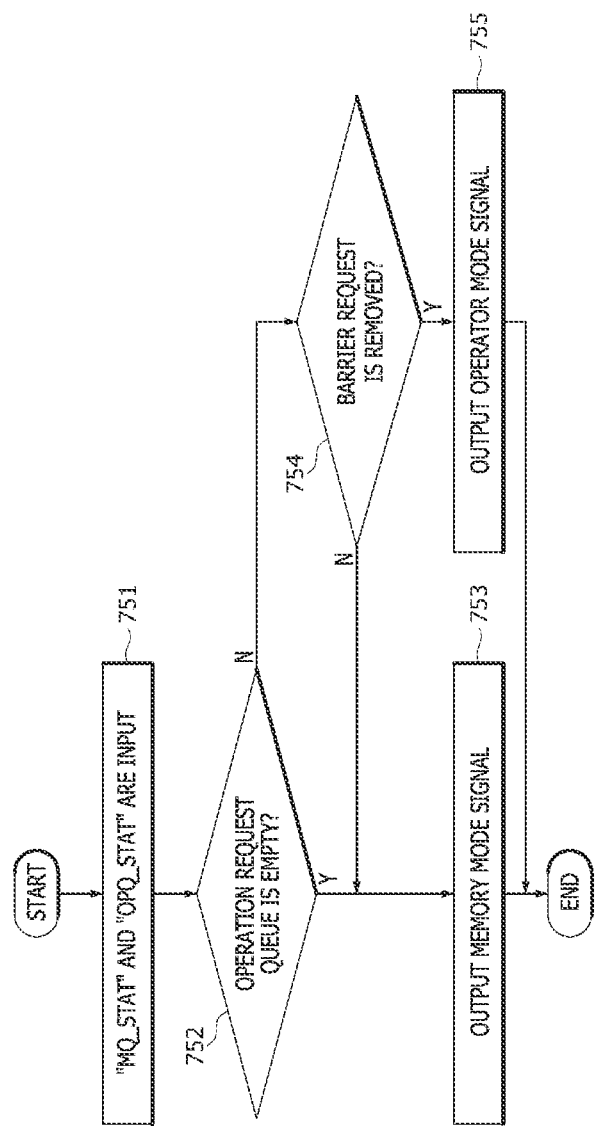
FIG. 18 is a flowchart illustrating an operation of a mode signal generating circuit included in the mode control circuit of FIG. 17.

FIG. 18 is a flowchart illustrating an operation of the mode signal generating circuit 653 included in the mode control circuit 650 of FIG. 17. In the following examples, it is assumed that the memory queue status signal MQ_STAT and the operation queue status signal OPQ_STAT are configured the same as those described with reference to FIG. 16 and FIG. 8, respectively.

Referring to FIG. 18, together with FIG. 17, in operation 751, the mode signal generating circuit 653 of the mode control circuit 650 may receive the memory queue status signal MQ_STAT and the operation queue status signal OPQ_STAT. In operation 752, the mode signal generating circuit 653 may determine whether the operation request queue (640 of FIG. 13) is in an empty status, based on the operation queue status signal OPQ_STAT. In the determination of operation 752, when the operation request queue (640 of FIG. 13) is in the empty status, that is, as described with reference to FIG. 8, when the first bit of the second binary stream constituting the operation queue status signal OPQ_STAT has a first logic level (i.e., has a binary value of "1"), in operation 753, the mode signal generating circuit 653 may generate a memory mode signal as the mode signal MODE to transmit the memory mode signal to the arbiter (360 of FIG. 13). In the determination of operation 752, when the operation request queue (640 of FIG. 13) is not in the empty status, that is, as described with reference to FIG. 8, the first bit of the second binary stream constituting the operation queue status signal OPQ_STAT has a second logic level (i.e., a binary value of "0"), in operation 754, the mode signal generating circuit 653 may determine whether the barrier request B_REQ is removed from the memory request queue (630 of FIG. 13), based on the memory queue status signal MQ_STAT.

In operation 754, when the barrier request B_REQ is not removed from the memory request queue (630 of FIG. 13), that is, as described with reference to FIG. 16, the third bit of the first binary stream constituting the memory queue status signal MQ_STAT has the second logic level (i.e., the binary value of "0"), the mode signal generating circuit 653 may generate the memory mode signal as the mode signal MODE to transmit the memory mode signal to the arbiter (360 of FIG. 13). In operation 754, when the barrier request B_REQ is removed from the memory request queue (630 of FIG. 13), that is, as described with reference to FIG. 16, the third bit of the first binary stream constituting the memory queue status signal MQ_STAT has the first logic level (i.e., the binary value of "1"), in operation 755, the mode signal generating circuit 653 may generate an operator mode signal as the mode signal MODE to transmit the operator mode signal to the arbiter (360 of FIG. 13).

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A memory device comprising:
   a memory-operator unit including memory circuits and operating circuits; and
   a request processing circuit configured to process a memory request and an operation request transmitted from a software domain to transmit a memory command and an address corresponding to the memory request and an operation command and an address corresponding to the operation request to the memory-operator unit,
   wherein the request processing circuit is configured to schedule processing of the memory request and the operation request, based on a status of the memory request remaining in the request processing circuit when the operation request is transmitted to the request processing circuit from the software domain,
   wherein the request processing circuit includes a memory ready circuit and an operation ready circuit,
   wherein the memory ready circuit is configured to perform an output operation of the memory request based on a first queue flag signal, and includes a first request output selecting circuit configured to perform a selective output operation of the memory request,
   wherein the operation ready circuit is configured to perform an output operation of the operation request based on a second queue flag signal, and includes a second request output selecting circuit configured to perform a selective output operation of the operation request,
   wherein the first request output selecting circuit is configured to allow output of the memory request when the first queue flag signal has a first logic level and to block the output of the memory request when the first queue flag signal has a second logic level,
   wherein the second request output selecting circuit is configured to allow output of the operation request when the second queue flag signal has the first logic level and to block the output of the operation request when the second queue flag signal has the second logic level, and
   wherein the first logic level is different from the second logic level.

2. The memory device of claim 1, wherein the request processing circuit is configured to process the operation request after processing the memory request received prior to the operation request.

3. The memory device of claim 1, wherein the request processing circuit is configured to stop receiving the memory request when the operation request is transmitted from the software domain.

4. The memory device of claim 3, wherein the request processing circuit is configured to resume receiving the memory request from the software domain after the operation request is processed.

5. The memory device of claim 1, wherein the request processing circuit is configured to generate a barrier request for stopping the processing of the memory request when the operation request is transmitted from the software domain.

6. The memory device of claim 1, wherein the request processing circuit is configured to receive the memory request from an operating system of the software domain and to receive the operation request from a driver of the software domain.

7. The memory device of claim 1, wherein the request processing circuit further includes:
   a memory request queue configured to store the memory request output from the memory ready circuit and to output a memory queue status signal indicating a storage status of the memory request;
   an operation request queue configured to store the operation request output from the operation ready circuit and to output an operation queue status signal indicating a storage status of the operation request;
   a mode control circuit configured to generate and output the first queue flag signal, the second queue flag signal, and a mode signal, based on the memory queue status signal and the operation queue status signal; and
   an arbiter configured to receive the memory request output from the memory request queue and the operation request output from the operation request queue, to output the memory request when the mode signal is a memory mode signal, and to output the operation request when the mode signal is an operator mode signal.

8. The memory device of claim 7, wherein the mode control circuit is configured to:
   initially set a logic level of each of the first queue flag signal and the second queue flag signal to the first logic level,
   change the logic level of the first queue flag signal from the first logic level to the second logic level, when at least one of a condition that the memory request queue is in a full status, a condition that the operation request is transmitted to the operation request queue, and a condition that the operation request queue is not in an empty status is satisfied, and change the logic level of the second queue flag signal from the first logic level to the second logic level, when a condition that the operation request queue is in the full status is satisfied.

9. The memory device of claim 7, wherein the memory request queue is configured to output the memory queue status signal whenever the memory request is input or the memory request is output, and wherein the operation request queue is configured to output the operation queue status signal whenever the operation request is input or the operation request is output.

10. The memory device of claim 9, wherein the memory queue status signal includes information on whether the memory request queue is in an empty status, whether the memory request queue is in a full status, whether the memory request is output from the memory request queue, and whether the memory request is input to the memory request queue, and wherein the operation queue status signal includes information on whether the operation request queue is in the empty status, whether the operation request queue is in the full status, whether the operation request is output from the operation request queue, and whether the operation request is input to the operation request queue.

11. The memory device of claim 7, wherein the mode control circuit includes:

a first queue flag signal generating circuit configured to receive the memory queue status signal and the operation queue status signal and to generate and output the first queue flag signal;

a second queue flag signal generating circuit configured to receive the operation queue status signal and to generate and output the second queue flag signal; and a mode signal generating circuit configured to receive the memory queue status signal and the operation queue status signal and to generate and output the memory mode signal or the operator mode signal as the mode signal.

12. The memory device of claim 11, wherein the first queue flag signal generating circuit is configured to:

output the first queue flag signal of the first logic level when the memory request queue is not in the full status, the operation request queue is in the empty status, and no operation request is input to the operation request queue, and output the first queue flag signal of the second logic level when the memory request queue is in the full status, when the operation request is input to the operation request queue, or when the operation request queue is not in the empty status.

13. The memory device of claim 11, wherein the second queue flag signal generating circuit is configured to:

output the second queue flag signal of the first logic level when the operation request is not in the full status, and output the second queue flag signal of the second logic level when the operation request is in the full status.

14. The memory device of claim 11, wherein the mode signal generating circuit is configured to:

output the memory mode signal as the mode signal when the operation request queue is in the empty status, or the operation request queue is not in the empty status and the memory request queue is in the empty status, and output the operator mode signal as the mode signal when the operation request queue is not in the empty status and the memory request queue is in the empty status.

15. The memory device of claim 7, wherein the first request output selecting circuit is configured to output a barrier request when the first queue flag signal has the second logic level.

16. The memory device of claim 15, wherein the memory request queue is configured to output the memory queue status signal when the memory request or the barrier request is input, the barrier request is removed from the memory request queue, or the memory request is output, and wherein the operation request queue is configured to output the operation queue status signal whenever the operation request is input or the operation request is output.

17. The memory device of claim 16, wherein the memory queue status signal includes information on whether the memory request queue is in an empty status, whether the memory request queue is in a full status, whether the barrier request is removed from the memory request queue, and whether the memory request or the barrier request is input to the memory request queue, and wherein the operation queue status signal includes information on whether the operation request queue is in the empty status, whether the operation request queue is in the full status, whether the operation request is output from the operation request queue, and whether the operation request is input to the operation request queue.

18. The memory device of claim 17, wherein the mode control circuit includes:

a first queue flag signal generating circuit configured to receive the memory queue status signal and the operation queue status signal and to generate and output the first queue flag signal;

a second queue flag signal generating circuit configured to receive the operation queue status signal and to generate and output the second queue flag signal; and a mode signal generating circuit configured to receive the memory queue status signal and the operation queue status signal and to generate and output the memory mode signal or the operator mode signal as the mode signal.

19. The memory device of claim 18, wherein the mode signal generating circuit is configured to:

output the memory mode signal as the mode signal when the operation request queue is in the empty status, or the operation request queue is not in the empty status and the barrier request is removed from the memory request queue, and output the operator mode signal as the mode signal when the operation request queue is not in the empty status and the barrier request is not removed from the memory request queue.

* * * * *